(12) United States Patent
Cristoforetti

(10) Patent No.: US 9,533,836 B2
(45) Date of Patent: Jan. 3, 2017

(54) SINGULATOR

(71) Applicant: MECHANICA SISTEMI S.R.L., Paderno Dugnano (IT)

(72) Inventor: Giorgio Cristoforetti, Varese (IT)

(73) Assignee: MECHANICA SISTEMI S.R.L., Paderno Dugnano (IT)

( * ) Notice: Subject to any disclaimer, the term of this patent is extended or adjusted under 35 U.S.C. 154(b) by 0 days.

(21) Appl. No.: 14/772,198

(22) PCT Filed: Mar. 3, 2014

(86) PCT No.: PCT/IB2014/059390
§ 371 (c)(1),
(2) Date: Sep. 2, 2015

(87) PCT Pub. No.: WO2014/136033
PCT Pub. Date: Sep. 12, 2014

(65) Prior Publication Data
US 2016/0031657 A1   Feb. 4, 2016

(30) Foreign Application Priority Data

Mar. 4, 2013  (IT) .............................. MI2013A0318

(51) Int. Cl.
*B65G 47/30* (2006.01)
*B65G 47/22* (2006.01)
(Continued)

(52) U.S. Cl.
CPC ............. *B65G 47/682* (2013.01); *B65G 47/22* (2013.01); *B65G 47/268* (2013.01); *B65G 47/30* (2013.01)

(58) Field of Classification Search
CPC ..... B65G 47/682; B65G 47/30; B65G 47/268; B65G 47/22
See application file for complete search history.

(56) References Cited

U.S. PATENT DOCUMENTS 1,931,453 A    10/1933  Adams
3,511,357 A     5/1970  Vanderhoof
(Continued)

FOREIGN PATENT DOCUMENTS

DE   102008060105 A1   6/2010
EP       1122195 A1   8/2001
(Continued)

*Primary Examiner* — Thomas Randazzo
(74) *Attorney, Agent, or Firm* — Jones Robb, PLLC

(57) ABSTRACT

A singulator has been realized which comprises a diverger module extending between an inlet station and an outlet station; the diverger module is configured to receive articles at the inlet station and convey them towards the outlet station along a main advancement direction. The diverger module has: a first zone extending from the inlet station to the outlet station and configured to impart to the articles resting thereon an advancement motion along the main advancement direction, a second zone flanking the first zone along the advancement direction and extending between the inlet station and the outlet station. The second zone is configured to impart to the articles resting thereon an advancement motion along the main direction and a lateral movement away from the first zone. The first zone of the diverger module projects, at least for a length, away from a prevalent average plane of extension of the second zone in the direction of the articles to be supported so as to define an ascent zone of the diverger module.

16 Claims, 44 Drawing Sheets

(51) Int. Cl.
*B65G 47/68* (2006.01)
*B65G 47/26* (2006.01)

(56) References Cited

U.S. PATENT DOCUMENTS

| | | | |
|---|---|---|---|
| 3,580,379 A | 5/1971 | Shuster et al. | |
| 3,774,748 A | 11/1973 | Dederer et al. | |
| 3,841,461 A | 10/1974 | Henderson et al. | |
| 4,019,620 A | 4/1977 | Frenkel et al. | |
| 4,039,074 A | 8/1977 | Maxted | |
| 4,044,897 A | 8/1977 | Maxted | |
| 4,264,002 A | 4/1981 | Van Der Schie | |
| 4,466,529 A | 8/1984 | Thrandorf et al. | |
| 4,846,336 A | 7/1989 | Hoyland et al. | |
| 5,400,896 A | 3/1995 | Loomer | |
| 5,410,232 A | 4/1995 | Lee | |
| 5,415,281 A | 5/1995 | Taylor et al. | |
| 5,531,311 A | 7/1996 | LeMay et al. | |
| 5,701,989 A * | 12/1997 | Boone | B65G 47/682 198/443 |
| 5,769,204 A | 6/1998 | Okada et al. | |
| 5,782,332 A | 7/1998 | Guidetti et al. | |
| 5,918,725 A | 7/1999 | Farina | |
| 5,950,800 A * | 9/1999 | Terrell | B65G 47/1492 198/448 |
| 6,131,723 A | 10/2000 | Schroader et al. | |
| 6,401,936 B1 | 6/2002 | Isaacs et al. | |
| 6,412,621 B1 * | 7/2002 | De Vree | B65G 37/02 198/347.4 |
| 6,471,044 B1 * | 10/2002 | Isaacs | B65G 43/08 198/347.4 |
| 6,694,220 B1 | 2/2004 | Tanz | |
| 7,191,894 B2 | 3/2007 | Costanzo et al. | |
| 7,344,018 B2 * | 3/2008 | Costanzo | B65G 17/24 198/370.09 |
| 7,896,150 B2 | 3/2011 | Smalley et al. | |
| 8,123,021 B2 * | 2/2012 | DePaso | B65G 17/24 183/370.09 |
| 9,038,810 B2 * | 5/2015 | Schroader | B65G 47/22 198/407 |
| 9,085,422 B2 * | 7/2015 | Cristoforetti | B65G 17/24 |
| 2001/0032773 A1 | 10/2001 | Pelka | |
| 2003/0141165 A1 | 7/2003 | Reznik et al. | |
| 2003/0221932 A1 | 12/2003 | Costanzo | |
| 2005/0023105 A1 | 2/2005 | Costanzo et al. | |
| 2007/0221475 A1 | 9/2007 | Halsey et al. | |
| 2007/0246328 A1 | 10/2007 | Reznik | |
| 2010/0006396 A1 | 1/2010 | Schmid | |
| 2010/0038210 A1 | 2/2010 | Cox et al. | |

FOREIGN PATENT DOCUMENTS

| | | |
|---|---|---|
| EP | 1293432 A1 | 3/2003 |
| JP | 08-067334 A | 3/1996 |
| JP | 2000-247419 A | 9/2000 |
| JP | 2007-153484 A | 6/2007 |
| JP | 2007-204222 A | 8/2007 |
| WO | 2008/124626 A2 | 10/2008 |
| WO | 2009/029091 A1 | 3/2009 |
| WO | 2009/114439 A2 | 9/2009 |
| WO | 2012/101576 A2 | 8/2012 |

* cited by examiner

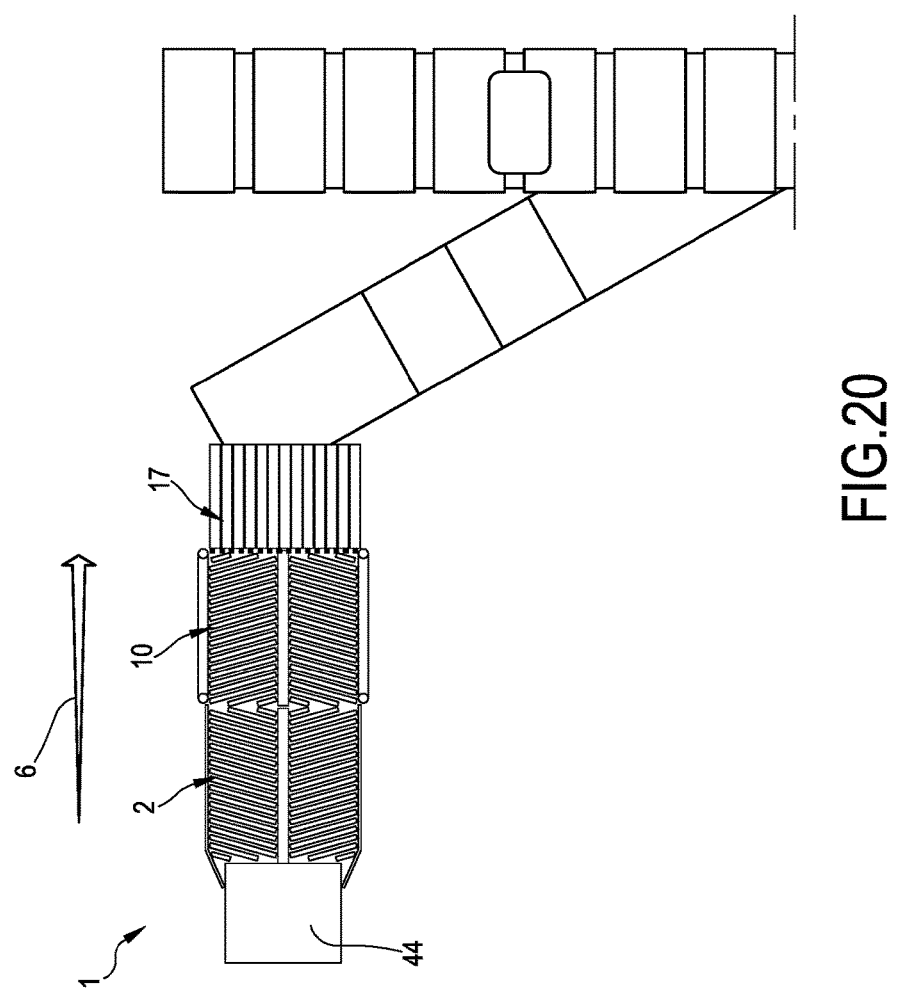

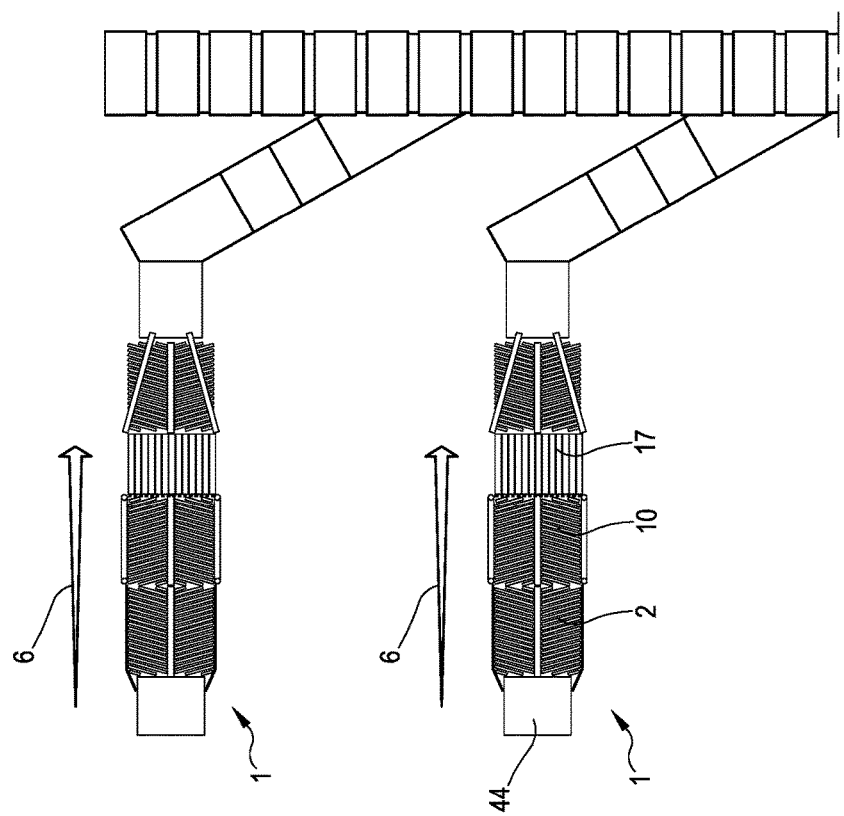

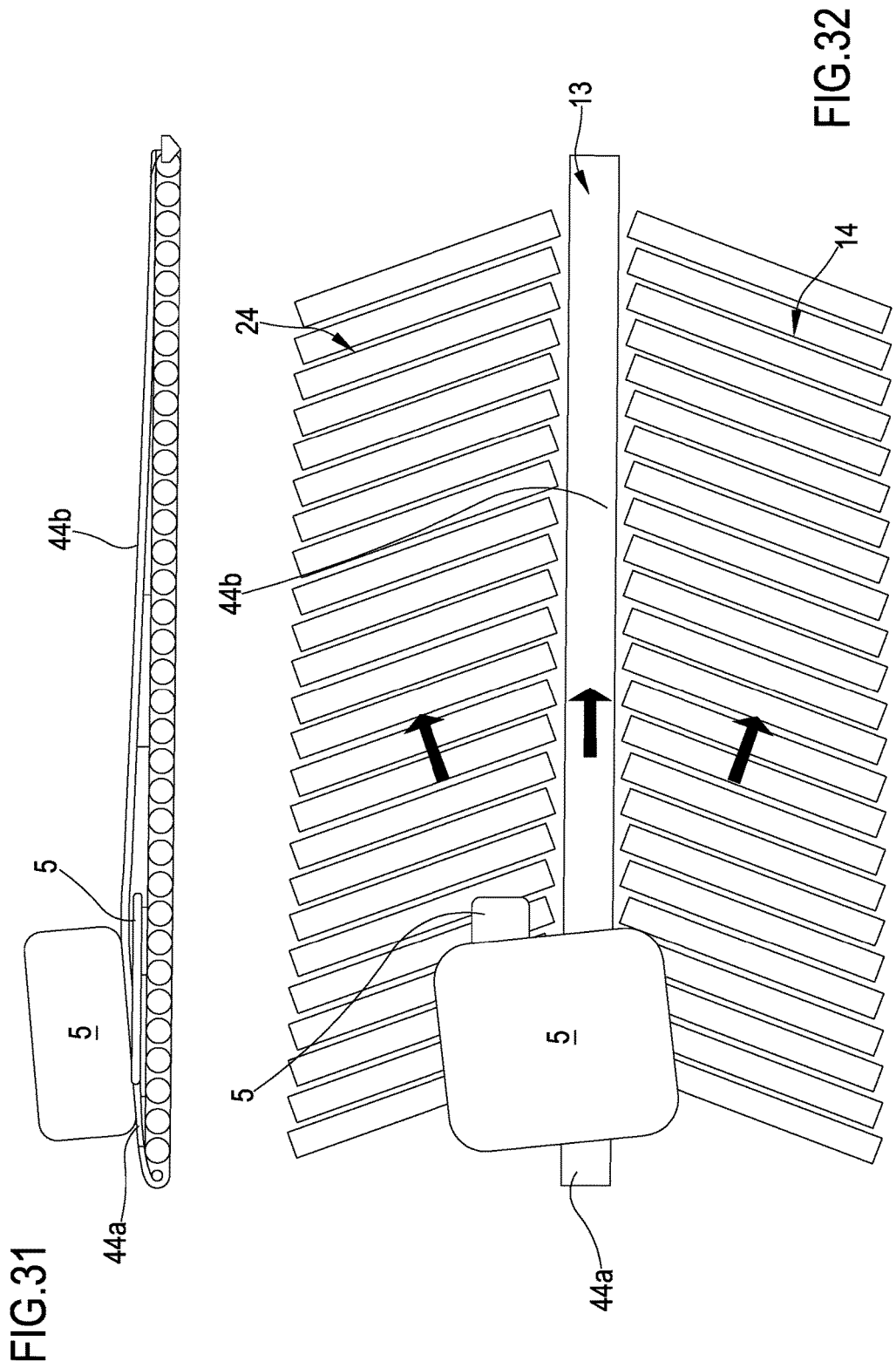

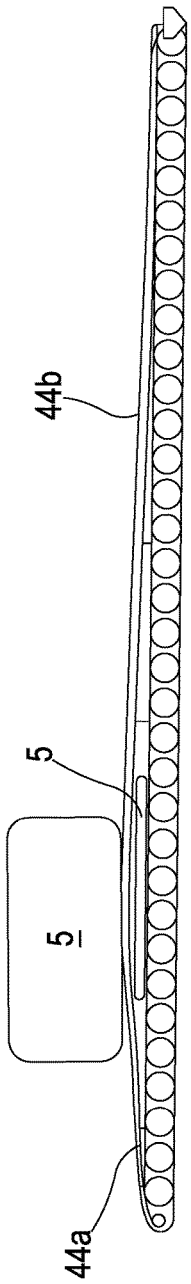
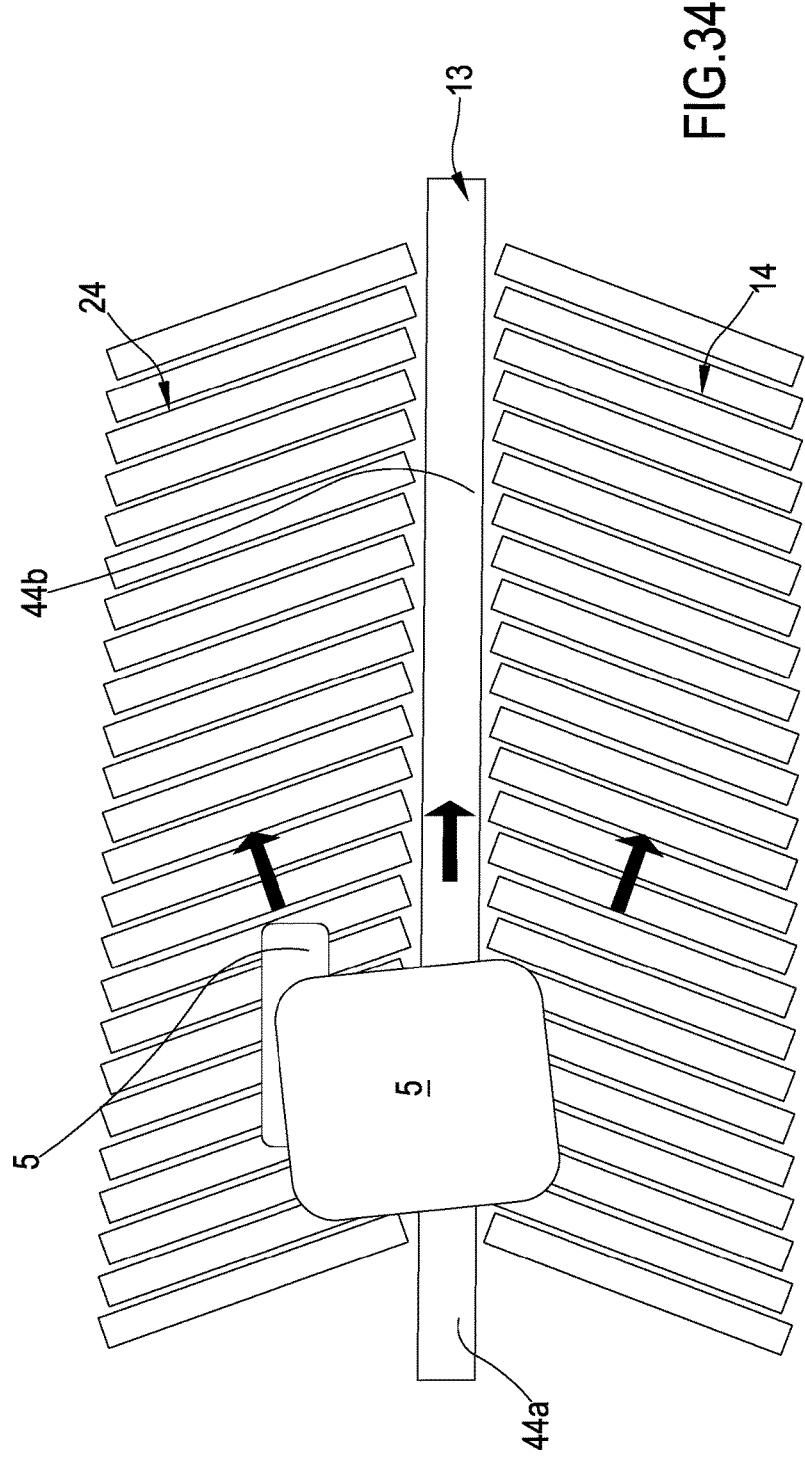

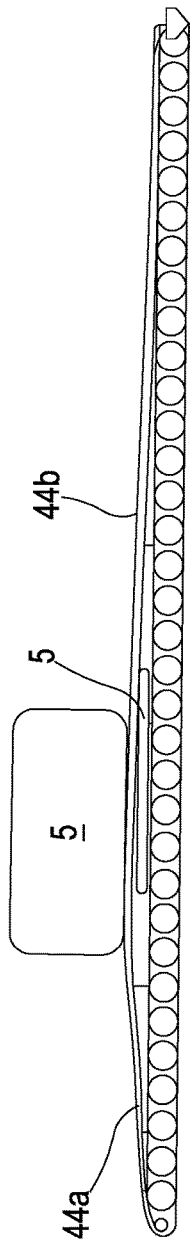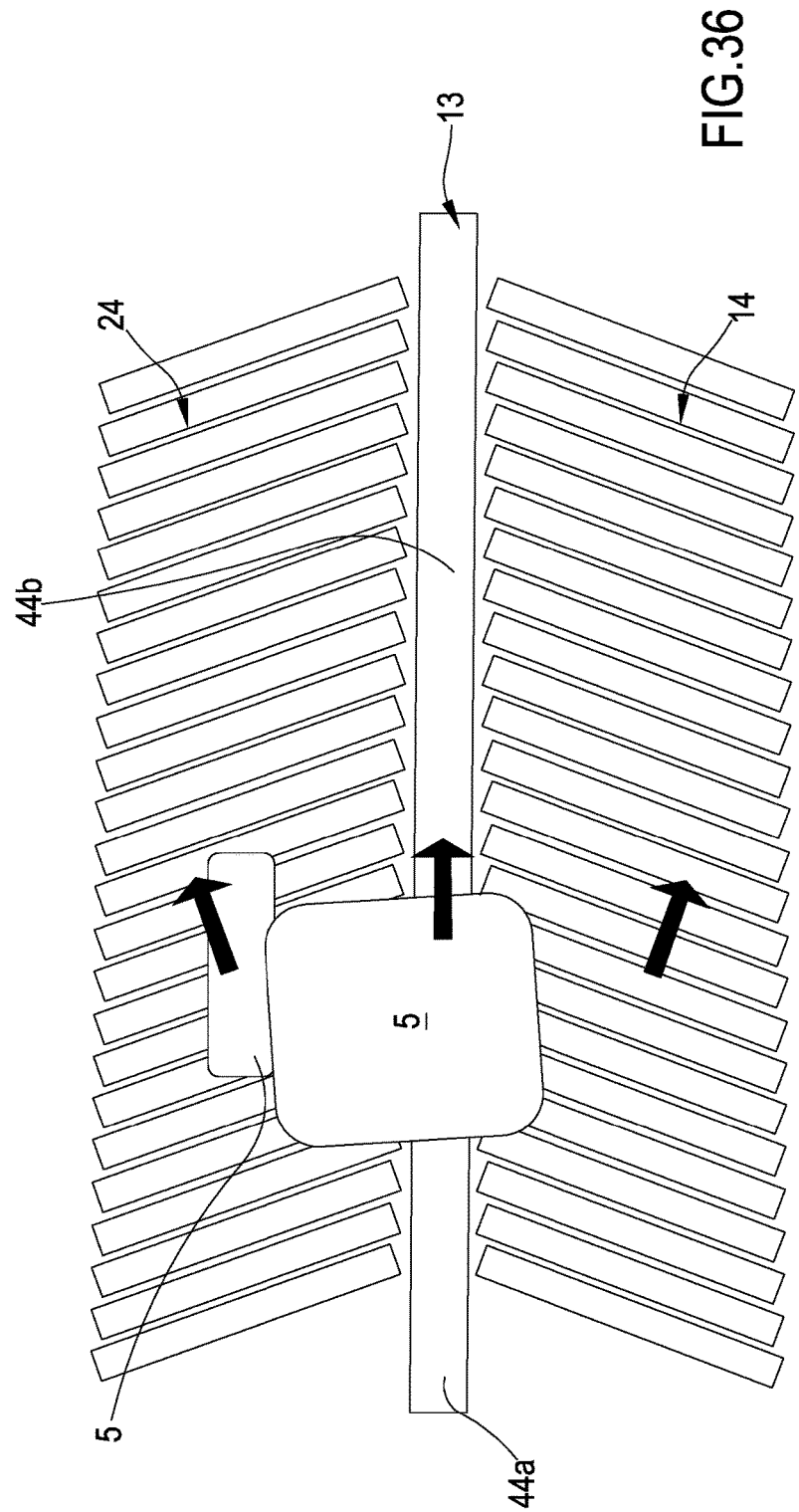

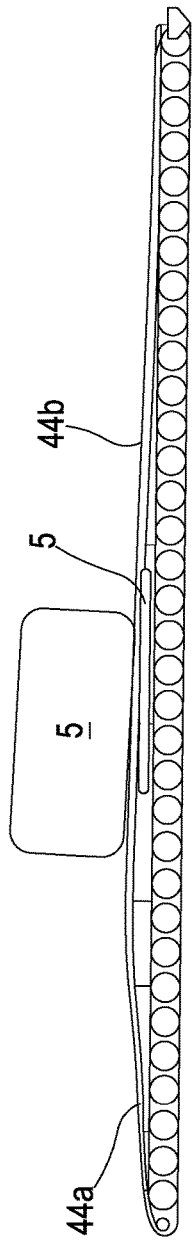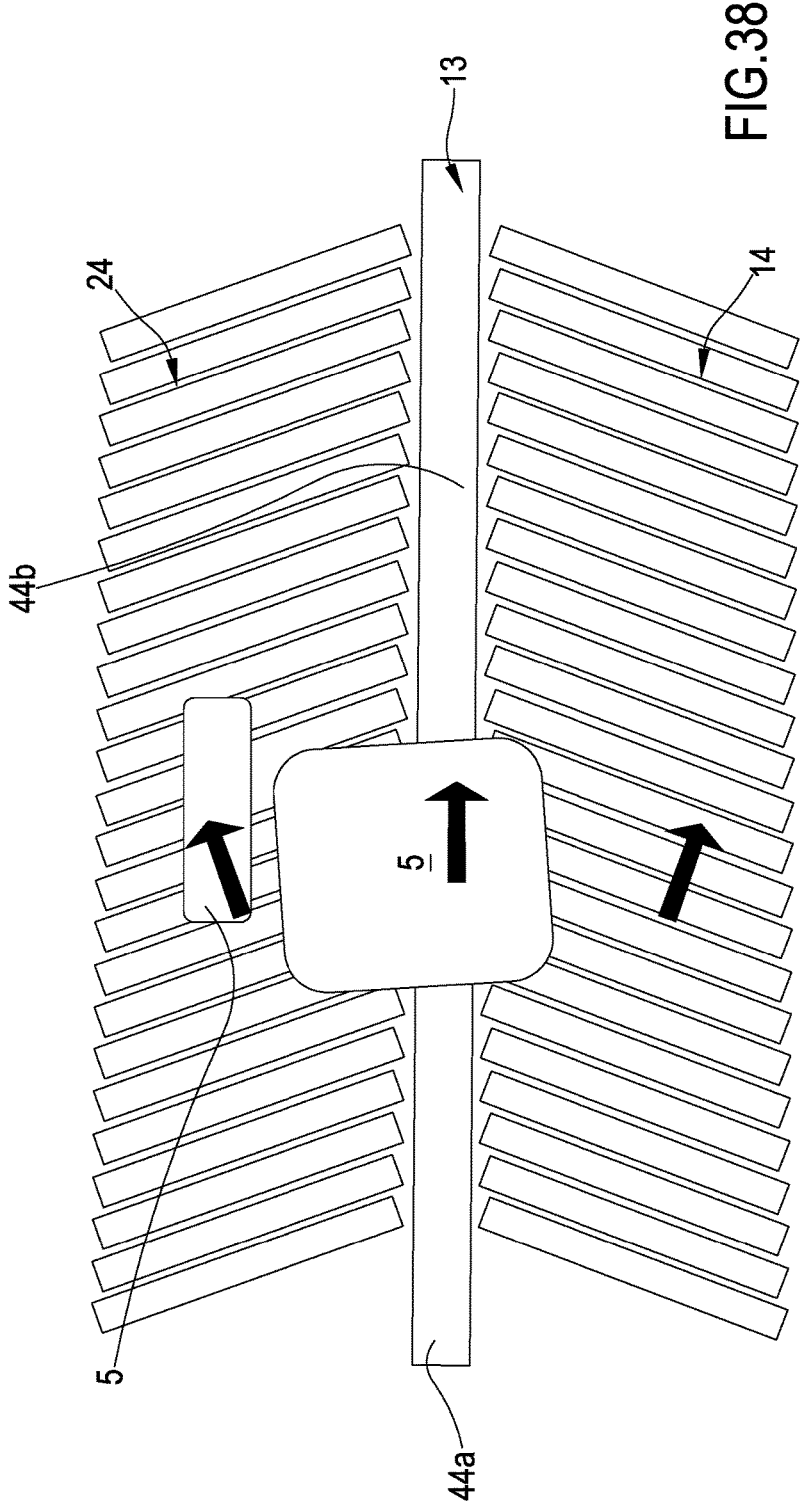

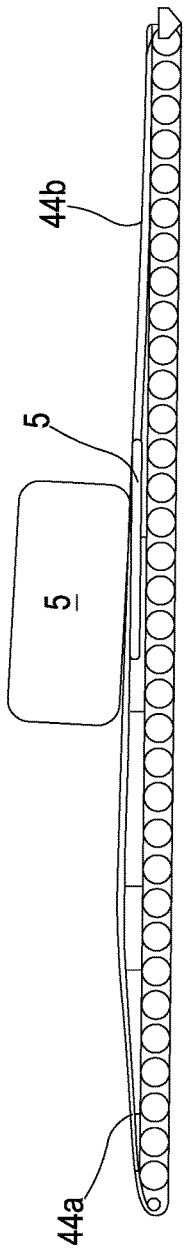
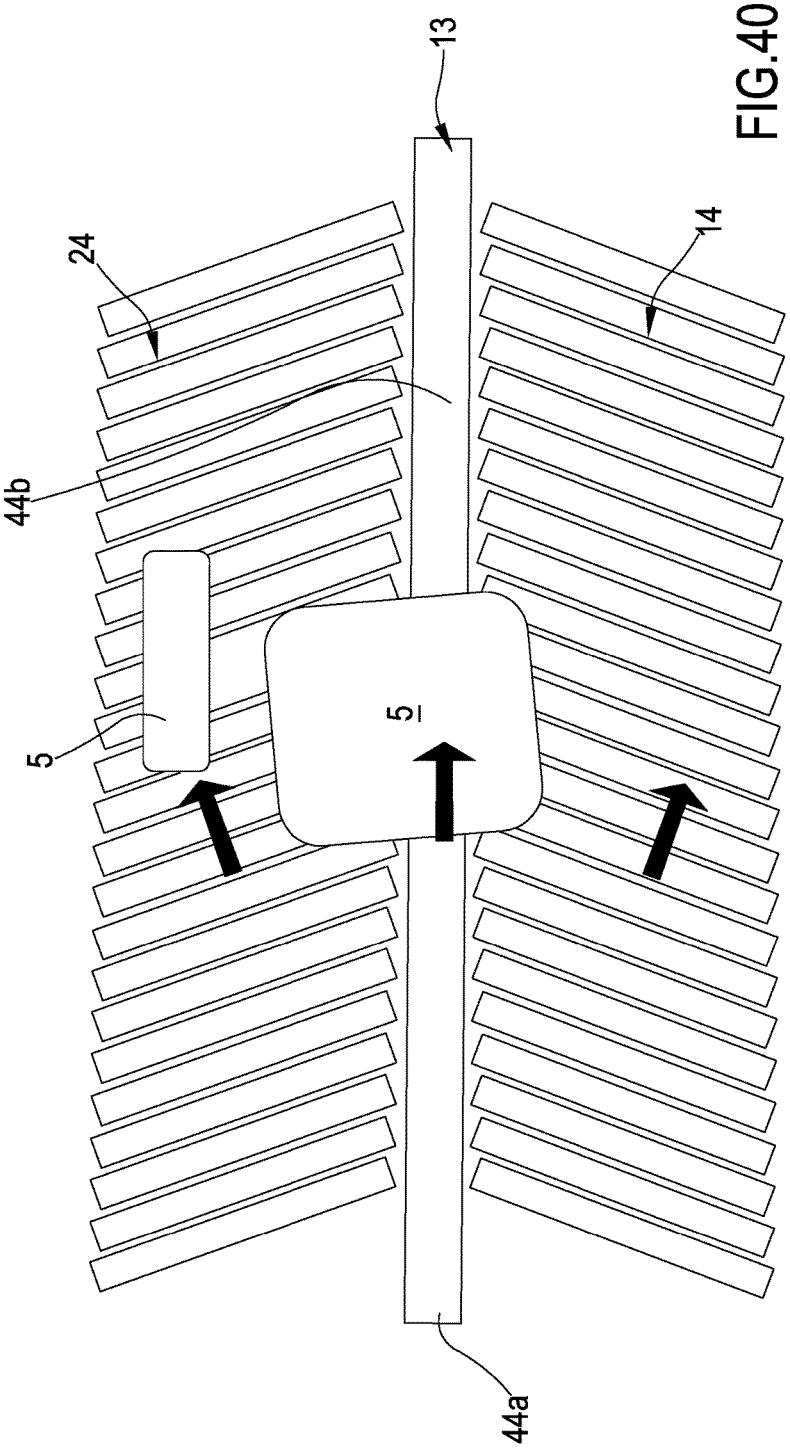

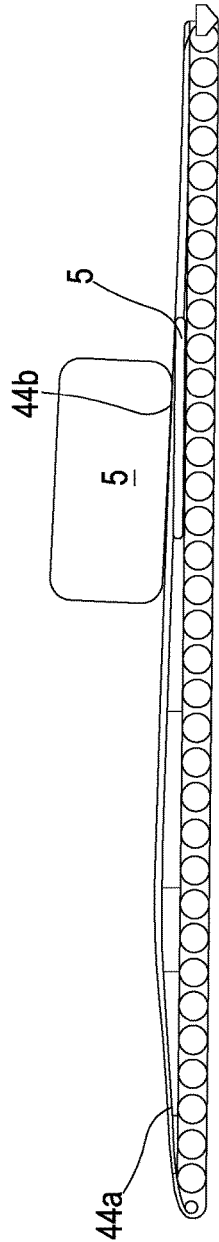
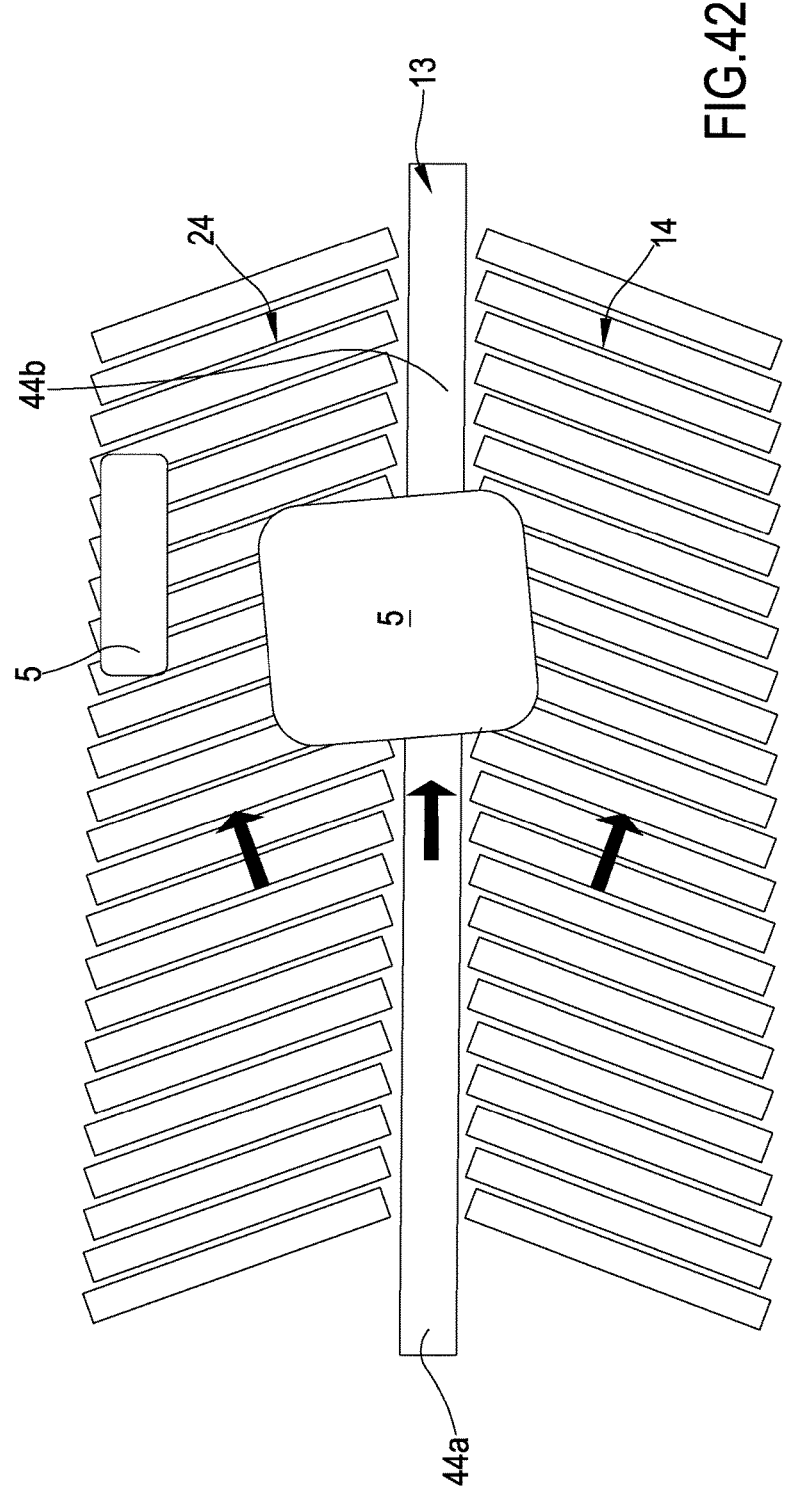
FIG.41
FIG.42

SINGULATOR

This application is a national stage application of International Application No. PCT/IB2014/059390, filed internationally on Mar. 3, 2014, which claims priority to Italian Application No. MI2013A000318, filed Mar. 4, 2013, the entire contents of each of which is incorporated by reference herein.

The present invention relates to a singulator, intended in particular to receive a plurality of incoming loose articles and to output the aforementioned plurality of articles, suitably singulated (in one or more lines), i.e. arranged consecutively along predetermined advancement lines.

TECHNOLOGICAL BACKGROUND

As is known, many commercial and industrial activities require a fixed number of articles that are generally fed randomly and are loosely ordered and then automatically sorted so that they can thereafter be handled more easily in an automatic or semi-automatic way.

The machines designed for this operation are known as "singulators".

The areas of use of singulators are varied, and include, by way of non-limiting example, the field of sorting and delivering mail, the dispatching and parcel distribution sector, etc.

There are several devices on the market today suitable for the performance of the above-mentioned task.

A first type of these machines comprises, in the main structure thereof intended for singulating operations, the use of a first converger station consisting of a central high-friction conveyor belt flanked on both sides by two respective roller conveyors having axes that are inclined relative to the direction of advancement of the articles.

The roller conveyors impart, to the articles resting thereon, an advancement motion and lateral translation towards the high-friction central belt, carrying the majority of articles onto the central belt itself.

Located after the converger station there is a diverger station, which is also a high-friction central belt which follows on from the central belt of the converger station and is designed to receive the articles that have been brought to the central zone of the device.

Flanking the central belt there are two roller conveyors which have rollers with inclined axes and are designed to impart to the articles entirely resting thereon an advancement motion and a corresponding lateral movement conveying them away from the high-friction central belt.

In particular, an article that might be at least partially resting on the central belt would be conveyed thereby and would not be affected by the lateral thrust of the corresponding roller conveyor; in contrast, a product resting exclusively on the roller conveyor will be conveyed away from the central belt. Appropriate conveyor belts or recirculating belts are present at the sides of the diverger station, which belts are destined to receive the products that have been conveyed away from the diverger roller conveyors and return them to the inlet of the machine and in particular to the inlet of the converger station so that they can be newly processed.

In contrast, the singulated products that are on the high-friction central belt proceed towards the further processing stations.

In this way, the products are singulated at the central zone of the machine, while all the articles which, in particular due to being superimposed in a direction that is transversal to the conveyance direction, should they not reach the central zone, are advantageously recirculated via the diverger station, and via the recirculating belts they are returned to the machine inlet and then re-processed.

U.S. Pat. No. 5,701,989 describes, with particular reference to FIG. 13, a device similar to the one described above and used in commerce.

The main difference is linked to the absence of a conveyor belt in the convergence zone (in other words there are only two roller conveyors converging towards the central advancement axis) and to the presence of a diverger station consisting of a plurality of additional conveyor belts with the aim of removing articles that are not singulated in such a way as to return them into the singulating cycle.

A second type of known devices suitable for singulating products is constituted by a complex apparatus in which all articles entering the device are suitably scanned by, for example, suitable cameras which can provide the read information to a control unit that reconstructs the distribution of the articles along the advancement pathway thereof.

In particular, a movement surface is present, consisting of an array of individual conveyor belts, all independently movable. In other words, the movement surface consists of a fixed number of rows and columns defined by a plurality of individual conveyor belts which are driven by the control unit via respective motors. As the control unit has the position of the single articles in its memory, and is monitoring the movements, it drives the conveyor belts at differentiated speeds, so as to be able to suitably orientate the articles by rotating them, and also to be able to space them apart in the longitudinal direction by differentiating the advancement speeds of the belts on which the articles are resting.

When leaving the deck, the various articles will be orientated in an orderly manner and will be sufficiently spaced along their respective advancement lines.

In this way, it will be possible to operate downstream of the surface along which the articles move, as they are already pre-ordered, and perform thereon a final singulation.

The above-mentioned machine is at least partially described in some patent publications, for example, in patents EP 1556297 and U.S. 2003/141165.

The singulators briefly described above, while admirably fulfilling the tasks they are designed for, are not free from limitations and/or operational problems.

For example, the singulators described above are not able to assure the correct singulation of articles in the event that two or more of said articles are superimposed on one another. Moreover, as regards the singulator having the converger station, the diverger station and the recirculating belt, the latter is extremely large, both longitudinally and transversally. In fact, the operating principle requires that all the products be carried on the central singulating conveyor belt, and implies the need to have predetermined lengths in the conveyance direction so as to ensure adequate filling of the high-friction central belt.

Furthermore, the need to be able to recirculate products that have not been singulated requires the presence of two further recirculating belts positioned at the sides of the machine, which obviously increases the dimensions thereof in that direction. What is described above generally implies the need to have large volumes/dimensions in order to install the singulators in question, resulting in increases in the costs of both constructing the device and managing the machine itself.

On the other hand, as the device has a multiplicity of conveyor belts that are independently movable, it is much more compact, but at the same time, extremely complex in terms of the construction and management of the operation thereof.

Indeed, it is necessary to set up a control unit and cameras to monitor the movement of the articles, as well as a control algorithm that can enable efficient and individual operation in a controlled manner on each of the conveyor belts.

Furthermore, each of the conveyor belts is equipped with a respective drive and a respective motor, which clearly increase the costs of construction and maintenance, while at the same time reducing the reliability of the singulator (considering the high number of electrical and mechanical parts that make it up).

OBJECT OF THE INVENTION

The object of the present invention is thus to substantially resolve at least one of the drawbacks and/or limitations of the previous solutions.

A first aim of the singulator, of which various embodiments are described below, is to provide a machine that is capable of assuring an effective singulation of articles, and in particular of assuring, in a diverger module, the separation of articles also in the event that at least two of them are vertically superimposed on one another.

A further aim of the singulator is to provide a machine that is sufficiently compact and at the same time fairly simple from the point of view of management and control.

One objective is to limit the active control functions required for singulating, thus also limiting the number of motors (and the consequent electronics), as well as the mechanical parts in motion.

Lastly, a further aim is to contain not only the transversal dimensions of the device, but also the longitudinal dimensions, by providing a singulator able to guarantee good singulating performances in terms of a maximum number of articles that can be singulated per unit of time and in terms of reliability of singulation.

One or more of the above-described objects, which will become more apparent from the following description, are substantially attained by a singulator according to one or more of the accompanying claims.

SUMMARY

Aspects of the invention are described here below.

In a first aspect there is envisaged a singulator comprising:
at least a diverger module (10) extending between an inlet station and an outlet station (12), the diverger module (10) being configured to receive articles (5) at the inlet station (11) and to convey them towards the outlet station (12) along a main advancement direction (6), the diverger module having:
    at least a first zone (13) extending from the inlet station (11) to the outlet station (12) and configured to impart to the articles (5) resting thereon an advancement motion along the main advancement direction (6);
    at least a second zone (14) flanking the first zone (13) along the advancement direction (6) and extending between the inlet station (11) and the outlet station (12), said second zone (14) being configured to impart to the articles (5) resting thereon an advancement motion along the main direction (6) and a lateral movement (15a) away from the first zone (13);
characterized in that, at least for a length, the first zone (13) of the diverger module (10) projects away from a prevalent average plane of extension of the second zone (14), in the direction of the articles (5) to be supported so as to define an ascent zone (15) of the diverger module (10).

In a 2nd aspect, in accordance with the first aspect, the ascent zone (15) comprises at least an ascending ramp (44a) and a descending ramp (44b) consecutively disposed along the advancement direction (6).

In a 3rd aspect, in accordance with the preceding aspect, the ascending ramp (44a) extends along a prevalent direction of extension which defines, with the prevalent average plane of extension of the second zone (14), a subtended angle comprised between 3° and 30°, in particular between 3° and 25°, and more in particular between 5° and 20°.

In a 4th aspect, in accordance with the 2nd or 3rd aspect, the descending ramp (44b) extends along a prevalent direction of extension which defines, with the prevalent average plane of extension of the second zone (14), a subtended angle comprised between 3° and 30°, in particular between 3° and 25°, and more in particular between 5° and 20°.

In a 5th aspect, in accordance with any one of the preceding aspects, the ascent zone (15) defines, relative to the second zone (14), a maximum difference in height comprised between 2 cm and 10 cm, in particular between 2 cm and 8 cm, even more in particular between 2 cm and 6 cm.

In a 6th aspect, in accordance with any one of the aspects from the 2nd to the 4th, the ascending ramp (44a) extends for a length of less than 50% of the total extent of the first zone (13). In a 7th aspect, in accordance with any one of the aspects from the 2nd to the 6th, the ascending ramp (44a) extends from the inlet station (11).

In an 8th aspect, in accordance with any one of the preceding aspects, the ascent zone (15) substantially extends for the full length of the diverger module (10).

In a 9th aspect, in accordance with any one of the preceding aspects, the ascent zone (15) extends between the inlet station (11) and outlet station (12).

In a 10th aspect, in accordance with any one of the preceding aspects, the diverger module (10) comprises:
    at least a—at least a third zone (16), flanking the second zone (14) along the main advancement direction (6) on the opposite side relative to the first zone (13) and extending from an initial position comprised between the inlet station (11) and a middle zone to the outlet station (12), the articles (5) being moved in said third zone (16) along the advancement direction (6) to the outlet station (12).

In an 11th aspect, in accordance with any one of the preceding aspects, the diverger module (10) comprises:
    a fourth zone (24) extending between an inlet station (11) and an outlet station (12) and flanking the first zone (13) along the main advancement direction (6) on the opposite side relative to the second zone (14), the fourth zone (24) being configured to impart to the articles (5) resting thereon an advancing movement along the main advancement direction (6) and a lateral movement (15b) away from the first zone (13), the lateral movement (15a), (15b) imparted by the second zone (14) and fourth zone (24) having, in particular, the same direction and respectively directed in the opposite way away from the zone (13); and
    a fifth zone (25) flanking the fourth zone (24) along the main advancement direction (6) on the opposite side relative to the first zone (13), the articles (5) being moved in said fifth zone (25) along the advancement direction (6) to the outlet station (12).

In a 12th aspect, in accordance with any one of the preceding aspects, the first zone (13) of the diverger module (10) comprises a conveyor (31), in particular a conveyor belt, configured to define, in cooperation with an article (5), a predetermined coefficient of friction greater than the defined coefficient of friction of the second zone (14) in cooperation with the same article (5).

In a 13th aspect, in accordance with any one of the preceding aspects, the first zone (13) of the diverger module (10) comprises a conveyor (31), in particular a conveyor belt, configured to define, in cooperation with an article (5), a predetermined coefficient of friction greater than the coefficient of friction defined by the fourth zone (14) in cooperation with the same article (5).

In a 14th aspect, in accordance with any one of the preceding aspects, the second zone (14) of the diverger module (10) comprises a conveying element (38), in particular a roller conveyor (39) whose rollers have an axis that is inclined relative to the main advancement direction (6) and configured to impart the advancement motion towards the outlet station (12) and the lateral movement (15a) away from first zone (13).

In a 15th aspect, in accordance with the preceding aspect, the fourth zone (24) of the diverger module (10) comprises a conveying element (40), in particular a roller conveyor (41) whose rollers have an axis that is inclined relative to the main advancement direction (6) and configured to impart the advancement motion towards the outlet station (12) and the lateral movement (15b) away from first zone (13).

In a 16th aspect, in accordance with any one of the preceding aspects, the third zone (16) of the diverger module (10) comprises a lateral wall (42) projecting from an average plane of the second zone (14), said lateral wall (42) being configured to supportingly receive the articles (5) pushed by the second zone (14) away from first zone (13), and configured to enable conveyance along the main advancement direction towards the outlet station (12).

In a 17th aspect, in accordance with the preceding aspect, the fifth zone (25) of the diverger module (10) comprises a lateral wall (43) projecting from an average plane of the fourth zone (24), said lateral wall (43) being configured to supportingly receive the articles pushed by the fourth zone (24) away from first zone (13), and configured to enable conveyance along the main advancement direction (6) towards the outlet station (12). In an 18th aspect, in accordance with any one of the preceding aspects, the singulator comprises at least a converger module (2) located upstream of the diverger module (10) and extending between an inlet station (3) and an outlet station (4).

In a 19th aspect, in accordance with the preceding aspect, the converger module (2) is configured to receive loose articles (5) at the inlet station (3) and to convey them towards the outlet station (4) along a main advancement direction (6), the converger module (2) having at least a first zone (7) defined between the inlet station (3) and the outlet station (4) along the main advancement direction (6) and configured to alternatively impart to the articles resting thereon an advancement motion along the main advancement direction (6) or an advancement motion along the main direction (6) and a lateral movement (9b) in the direction of an adjacent second zone (8), at least a second zone (8) flanking the first zone (7) along the main advancement direction (6) and extending between the inlet (3) and the outlet station (4), the second zone (8) being configured to impart to the articles (5) resting thereon an advancement motion along the main direction (6) and a lateral movement (9a) in the direction of the first zone (7).

In a 20th aspect, in accordance with the preceding aspect, the first zone (13) of the diverger module (10) is configured to receive articles arriving from the first zone (7) of the converger module (2).

In a 21st aspect, in accordance with the 19th or 20th aspect, the converger module (2) comprises a third zone (23) flanking the first zone (7) along the main advancement direction (6) on the side opposite to the second zone (8) and extending between the inlet station (3) and outlet station (4), the third zone (23) being configured to impart to the articles (5) resting thereon an advancement motion along the main advancement direction (6) and a lateral movement (9b) in the direction of an adjacent second zone (8), at least a second zone (8) flanking the first zone (7) along the main advancement direction (6) and extending between the inlet (3) and the outlet station (4), the second zone (8) being configured to impart to the articles (5) resting thereon an advancement motion along the main direction (6) and a lateral movement (9b) in the direction of the first zone (7), the lateral movement (9b; 9a) respectively from the third zone (23) and from the second zone (8) towards the first zone (7) having, in particular, the same direction and respectively directed in the opposite way towards the first zone (7).

In a 22nd aspect, in accordance with any one of the preceding aspects from the 19th to the 21st aspect, the first zone (7) of the converger module (2) comprises a conveyor (30), for example a conveyor belt, configured to define, in cooperation with an article (5), a predetermined coefficient of friction greater than the coefficient of friction defined by the second zone (8) in cooperation with the same article (5), and being greater, in particular, than the coefficient of friction of the third zone (23).

In a 23rd aspect, in accordance with any one of the preceding aspects from the 19th to the 22nd, the first zone (7) of the converger module (2) comprises at least a conveying element (32), in particular a roller conveyor (33) whose rollers have an axis that is inclined relative to the main advancement direction (6) and configured to impart to the articles (5) resting thereon an advancement motion along main advancement direction (6) and a lateral movement (9b) in the direction of the second zone (8). In a 24th aspect, in accordance with any one of the preceding aspects from the 19th to the 23rd, the second zone (8) of the converger module (2) comprises a conveying element (34), in particular a roller conveyor (35) whose rollers have an axis that is inclined relative to the main advancement direction (6), so as to impart the advancement motion towards the outlet station (4) and a lateral movement (9a) towards the first zone (7), the third zone (23) of the converger module (2) comprising, in particular, a roller conveyor (37) whose rollers have an axis that is inclined relative to the main advancement direction (6), so as to impart the advancement motion towards the outlet station (4) and the lateral movement (9b) towards the first zone (7).

In a 25th aspect, in accordance with any one of the preceding aspects, the singulator comprises:
  at least a selector module (17) located downstream of the diverger module (10) along the main advancement direction (6) and extending between a respective inlet station (18) and an outlet station (19), the selector module (17) having a first zone (20) configured to receive the articles conveyed at least by the first zone (13) of the diverger module (10) and to impart to the articles resting thereon an advancement motion along the main advancement direction (6) from the inlet station (18) to the outlet station (19), and having a second zone (21) configured to receive the articles conveyed from the third zone (16) of the diverger module (10) and to impart to the articles resting thereon an advancement motion along the main advancement direction (6) from inlet station (18) to outlet station (19);

a control unit (22), which is active at least on the first zone (20) of the selector module (17) so as to impart an advancement motion along the main advancement direction (6) according to a first speed profile and active at least on the second zone (21) of the selector module (17) so as to impart an advancement motion along the main advancement direction (6) according to a second speed profile independent of the first speed profile.

In a 26th aspect, in accordance with the preceding aspect, the selector module (17) comprises a third zone (26) configured to receive the articles moved by the fifth zone (25) of the diverger module (10) and to impart, to the articles resting thereon, an advancement motion along the main advancement direction (6) from the inlet station (18) to the outlet station (19), the control unit (22) being active on the third zone (26) of the selector module (17) so as to impart an advancement motion along the main advancement direction (6) according to a third speed profile independent of the first speed profile and/or from the second speed profile.

In a 27th aspect, in accordance with the 25th or 26th aspect, the singulator comprises a detection system (27) serving the control unit (22) so as to detect, over time, the passage of the articles (5) entering the selector module (17) at least in the first and second zones (20, 21) thereof, and in particular also in the third zone (26), the control unit (22) determining the speed profiles of the respective zones based on the detection data received from the detection system (27), the speed profiles being set, in particular, so as to enable the articles (5) to be fed out from the outlet station (19) in a singulated configuration, i.e. not superimposed, along a transversal length of the selector module (17), for example a length perpendicular to the main advancement direction (6).

In a 28th aspect, in accordance with any one of the aspects from the 25th to the 27th, the selector module (17) comprises a fourth zone (28) flanking and interposed between the first and second zones (20, 21) along the main advancement direction (6) and a fifth zone (29) flanking and interposed between the first and third zones (20, 26) along the main advancement direction (6), said fourth and fifth zones (28, 29) extending from the inlet station (18) to the outlet station (19), in particular the fourth and fifth zones (28, 29) comprising surfaces moved with a coefficient of friction that is lower than the coefficient of friction of the respective adjacent zones.

In a 29th aspect, preferably according to any one of the preceding aspects, comprising:

at least a diverger module (10) extending between an inlet station (11) and an outlet station (12), the diverger module (10) being configured to receive articles (5) at the inlet station (11), and to convey them towards the outlet station (12) along a main advancement direction (6), the diverger module (10) having a first zone (13) for imparting to the articles resting thereon an advancement motion along the main advancement direction (6), a second zone (14) flanking the first zone (13) along the advancement direction (6) and extending between the inlet station (11) and the outlet station (12), said second zone (14) being configured to impart to the articles resting thereon an advancement motion along the main direction (6) and a lateral movement (15a) away from the first zone (13), at least a third zone (16), flanking the second zone (14) along the main advancement direction (6) on the opposite side relative to the first zone (13) and extending from an initial position comprised between the inlet station (11) and a middle zone to the outlet station (12), the articles in said third zone (16) being moved along the advancement direction (6) to the outlet station (12), the first zone (13) of the diverger module (10) projecting, at least for a length, away from a prevalent average plane of extension of the second zone (14) in the direction of the articles (5) to be supported so as to define an ascent zone (15) of the diverger module (10), at least a selector module (17) located downstream of the diverger module (10) along the main advancement direction (6) and extending between a respective inlet station (18) and an outlet station (19), the selector module (17) having a first zone (20) configured to receive the articles conveyed at least by the first zone (13) of the diverger module (10) and to impart to the articles resting thereon an advancement motion along the main advancement direction (6) from the inlet station (18) to the outlet station (19), and having a second zone (21) configured to receive the articles conveyed from the third zone (16) of the diverger module (10) and to impart to the articles resting thereon an advancement motion along the main advancement direction (6) from the inlet station (18) to the outlet station (19); and a control unit (22), which is active at least on the first zone (20) of the selecting module (17) so as to impart an advancement motion along the main advancement direction (6) according to a first speed profile and active at least on the second zone (21) of the selector module (17) so as to impart an advancement motion along the main advancement direction (6) according to a second speed profile independent of the first speed profile.

In a 30th aspect, there is envisaged a process for singulating loose articles comprising the following steps:

feeding with articles (5) a diverger module (10) of a singulator (1), the diverger module (10) having a first zone (13) configured to impart to the articles resting thereon an advancement motion along a main advancement direction (6), a second zone (14) flanking the first zone (13) along the advancement direction (6), configured to impart to the articles (5) resting thereon an advancement motion along the main direction (6) and a lateral movement (15a) away from first zone (13), the first zone (13) of the diverger module (10) projecting, at least for a length, away from a prevalent average plane of extension of the second zone (14) in the direction of the articles (5) to be supported, in order to define an ascent zone (15) of the diverger module (10), conveying the articles (5) resting on the first zone (13) of the diverger module (10) along the advancement direction (6), said conveying sub-step comprising a sub-step of moving the articles (5) into the ascent zone (15) on which the articles (5) are vertically spaced relative to the average plane of extension of the second zone (14);

conveying the articles (5) resting in the second zone (14) of the diverging module (10) along the main direction (6) and with a lateral movement (15a) away from the first zone (13).

In a 31st aspect, in accordance with the preceding aspect, the process further comprises the following steps:

sending the articles exiting the diverger module (10) to a selector module (17) comprising a first zone (20) configured to receive the articles (5) arriving from the first zone (13) of the diverger module (10) so as to impart to the articles resting thereon an advancement motion along the main advancement direction (6) from the inlet station (18) to the outlet station (19) and a second zone (21) configured to receive the articles arriving from the third zone (16) of the diverger module (10) so as to impart to the articles resting thereon an advancement motion along the main advancement direction (6) from the inlet station (18) to the outlet station (19);

conveying, upon a command from a control unit (22), the articles (5) resting in the first zone (20) of the selector module (17) along the main advancement direction according to a first speed profile;

conveying, upon a command from the control unit (22), the articles (5) resting in the second zone (21) of the selector module (17) from the inlet station (18) to the outlet station (19) according to a second speed profile that is different from the first speed profile.

In a 32nd aspect, in accordance with the 30th or 31st aspect, the process further comprises the following steps:

feeding, with loose articles (5), a converger module (2) of a singulator (1), the converger module (2) extending between an inlet station (3) and an outlet station (4) and being configured to receive loose articles (5) at the inlet station (3) and to convey them towards the outlet station (4) along a main advancement direction (6), the converger module having at least a first zone (7) defined between the inlet station (3) and the outlet station (4) along the main advancement direction (6) and configured to alternatively impart to the articles resting thereon an advancement motion along the main advancement direction (6) or an advancement motion along the main advancement direction (6) and a lateral movement (9b) in the direction of an adjacent second zone (8), and at least a second zone (8) flanking the first zone (7) along the main advancement direction (6) and extending between the inlet station (3) and the outlet station (4) along the main advancement direction (6) and configured to impart to the articles resting thereon an advancement motion along the main direction (6) and a lateral movement (9b) in the direction of the first zone (7);

conveying the articles (5) resting in the first zone (7) along the main advancement direction (6), or conveying the articles resting in the first zone (7) along the main advancement direction (6) and along the lateral direction (9b) in the direction of the first zone (7);

moving the articles (5) resting in the second zone (8) along the main advancement direction (6) and with a lateral movement direction (9a) in the direction of the first zone (7);

sending the articles (5) exiting the converger module (2) to the diverger module (10).

BRIEF DESCRIPTION OF THE DRAWINGS

Some embodiments and some aspects of the invention will be described below with reference to the appended drawings, provided solely by way of non-limiting example, in which:

FIGS. 19A-19I and FIGS. 19L-19O show an operating sequence of the singulator in successive instants of time;

FIGS. 20, 21 and 22 show three possible variants of systems comprising the singulator to which the description relates;

FIGS. 31 to 42 show an operating sequence of the singulator in successive instants of time.

DETAILED DESCRIPTION

Figure 1:
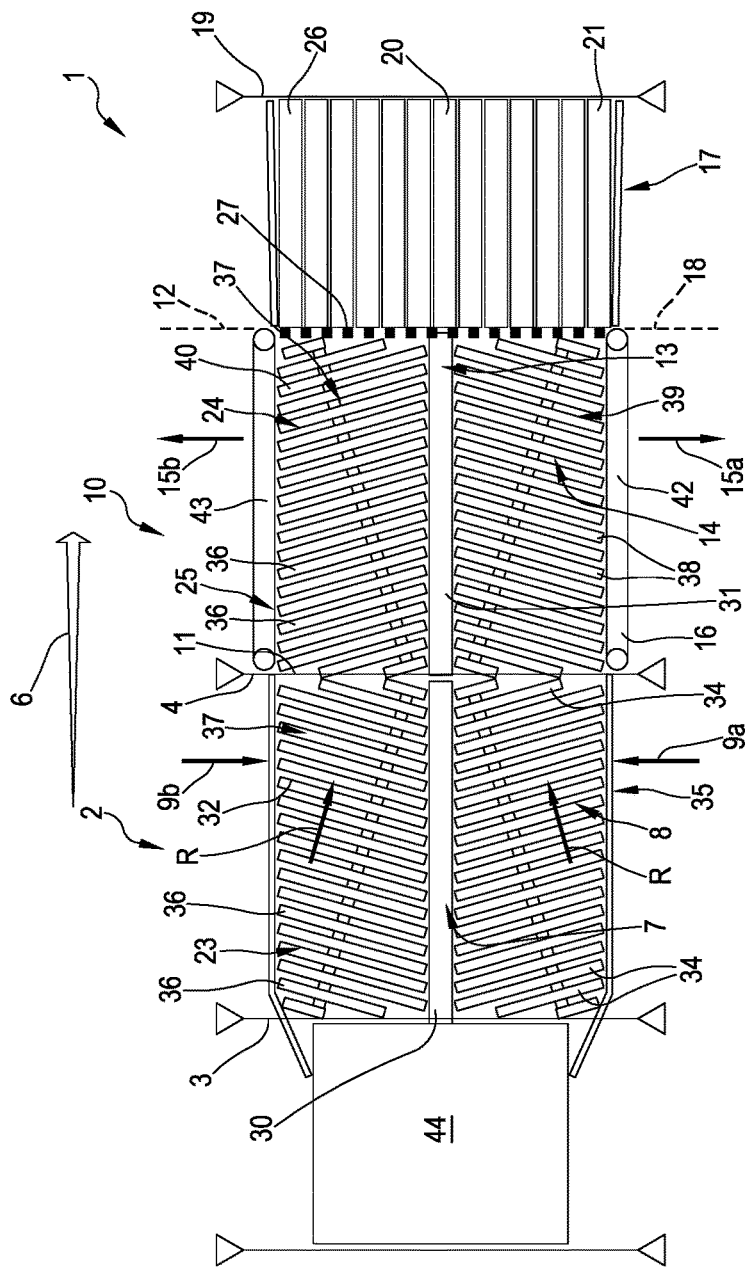
FIG. 1 illustrates a first embodiment of a singulator described hereunder.

With reference to the aforesaid figures, 1 denotes in its entirety a singulator as described below.

In particular, and as previously mentioned, the singulator that is the subject matter of the following description is particularly intended for the singulation of loosely arranged items 5.

In particular, the articles 5, which may have undergone further manipulation if necessary before reaching the inlet of the singulator (e.g. unstacking operations for supplying them to the inlet in a two-dimensional configuration) are brought to the inlet of the singulator by a suitable conveyor belt (or equivalent system) for infeeding them to the main modules of the singulator.

In particular, the products initially reach an inlet station 3 of a converger module 2.

The converger module 2 extends longitudinally along a main direction 6 of advancement of the articles between the above-mentioned inlet station 3 and an outlet station 4.

In general, the loose articles 5 entering the converger module 2 will be conveyed (and appropriately handled) starting from the inlet station 3 along the main advancement direction up until reaching the outlet station 4, so as to be received by successive modules of the singulator.

Observing in particular the figures and the various embodiments, it can be seen that, in general terms, the converger module 2 primarily features at least a first zone 7 defined between the inlet station 3 and the outlet station 4 along the main advancement or conveyance direction of the articles 6.

This zone 7 will generally, in a view from above, have a rectangular profile with a main geometry that extends substantially parallel to the main direction of extension 6, and with the two opposite shorter sides located at the inlet and outlet stations 3 and 4.

This zone 7 will be generally configured so as to impart to the articles resting thereon a direct advancement motion exclusively along the main advancement direction 6 (see for example FIG. 1). In other words, the first zone 7 will include at least one conveyor configured so as to impart this movement to the articles 5.

Figure 3:
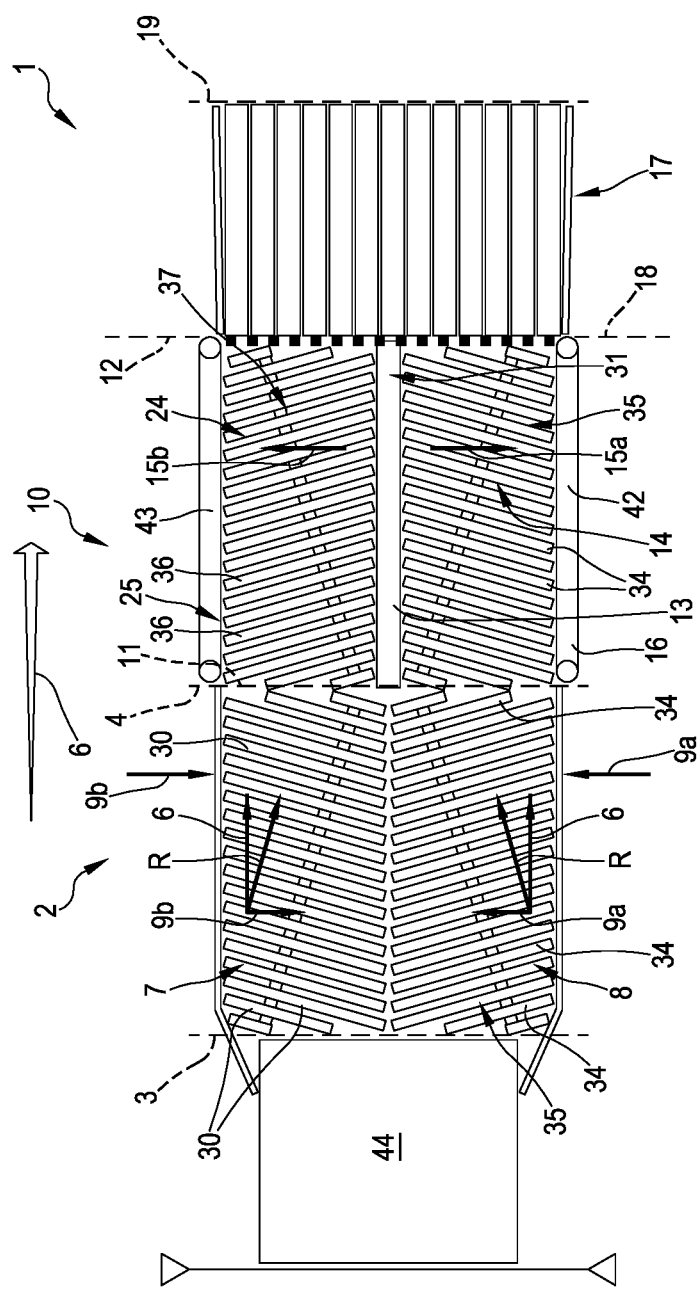
FIG. 3 illustrates a further variant of the singulator of FIG. 1.

Alternatively (see FIG. 3) the first zone 7 (i.e. the corresponding conveyor) may be configured so as to impart to the articles 5 resting thereon not only an advancement motion along the main direction 6, but also a lateral movement 9b in a direction perpendicular to the advancement direction directed towards a second zone 8. In other words, the conveyor will be able to impart a parallel motion to the articles or, in an alternative embodiment, a motion directionally inclined (resultant R in the figures) relative to the main advancement direction 6 (or to the main axis of extension of the singulator). Once more from a general point of view, the converger module 2 also features a second zone 8 which flanks the first zone 7 along the main advancement direction 6 and also extends between the inlet station 3 and the outlet station 4 of the module 2. The second zone 8 is configured to impart to the articles 5 resting thereon an advancement motion along the main direction 6 and also a lateral movement 9a in the direction of the first zone 7.

In this regard, the second zone 8 will include at least one conveyor (and in general a plurality thereof) configured to impart the described movement to the articles (inclined; resultant R).

This second zone 8, in a view from above, also has a rectangular profile extending mainly in a direction parallel to the main advancement direction 6, and with the shorter opposite sides positioned at the inlet station 3 and the outlet station 4. In particular, the two corresponding longer sides of the first zone 7 and the second zone 8, are side by side and facing each other.

In the majority of the illustrated embodiments (except for FIGS. 2 and 3) the converger module 2 also includes a third zone 23 flanking the first zone 7 along the main advancement direction 6 and positioned on the side opposite to the second zone 8.

In general, the first zone 7 will therefore be interposed between the second zone 8 and the third zone 23; the three zones 23, 7, 8 will be adjacent (in particular in contact) and parallel to one another along the advancement direction of the articles as shown in FIG. 1 for example.

The third zone 23 also extends between the inlet station 3 and the outlet station 4 and exhibits, in a view from above, a substantially rectangular profile with the longer sides directed along the main advancement direction 6 and shorter sides that are opposite and positioned at the inlet and outlet stations 3 and 4. The third zone 23 is configured to impart to the articles 5 resting thereon an advancement motion along the main direction 6 and also a lateral movement 9b in the direction of the first zone 7; in particular, the lateral movements 9a, 9b imparted respectively by the second zone 8 and the third zone 23 have the same direction (perpendicular to the main direction 6) and are respectively directed in the opposite way towards the first zone 7.

In still other words, the second zone 8 and the third zone 23 impart, to the articles resting thereon, not only an advancement motion towards the outlet station 4, but also a lateral movement serving to convey the articles towards the first central zone 7; the resultant force on the articles is denoted by R.

Figure 2:
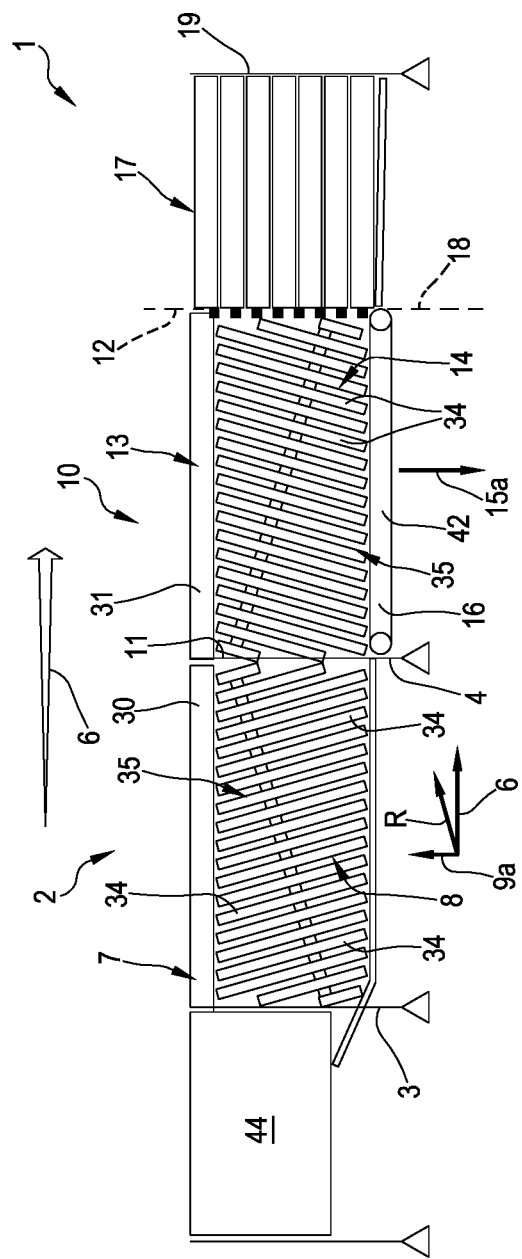
FIG. 2 illustrates a variant of the singulator of FIG. 1.

From the point of view of realisation, the first zone 7 will include a corresponding conveyor 30 which can, by way of example, be defined by a conveyor belt as shown in FIGS. 1 and 2. This conveyor belt is generally more limited in its transversal dimensions relative to the transversal dimensions and respective conveyors of the second and third zones 8, 23 of the converger module 2.

FIG. 1 (and the following figures) shows a single conveyor belt that runs along the whole converger module 2 from the inlet station 3 to the outlet station 4.

Obviously two or more belts having longitudinal dimensions that are more modest may be present, consecutively arranged and aligned with one another.

Figure 4:
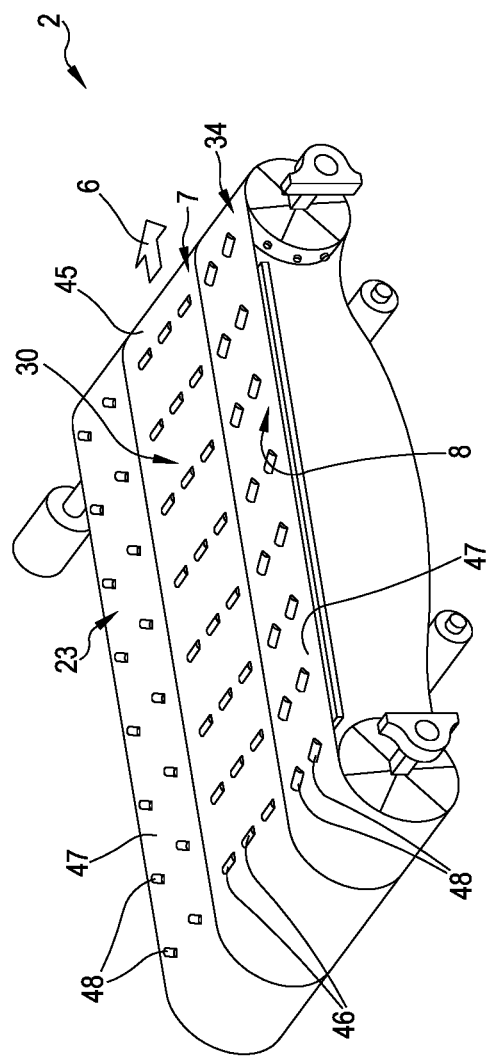
FIG. 4 illustrates a possible variant of the converger module.
Figure 5:
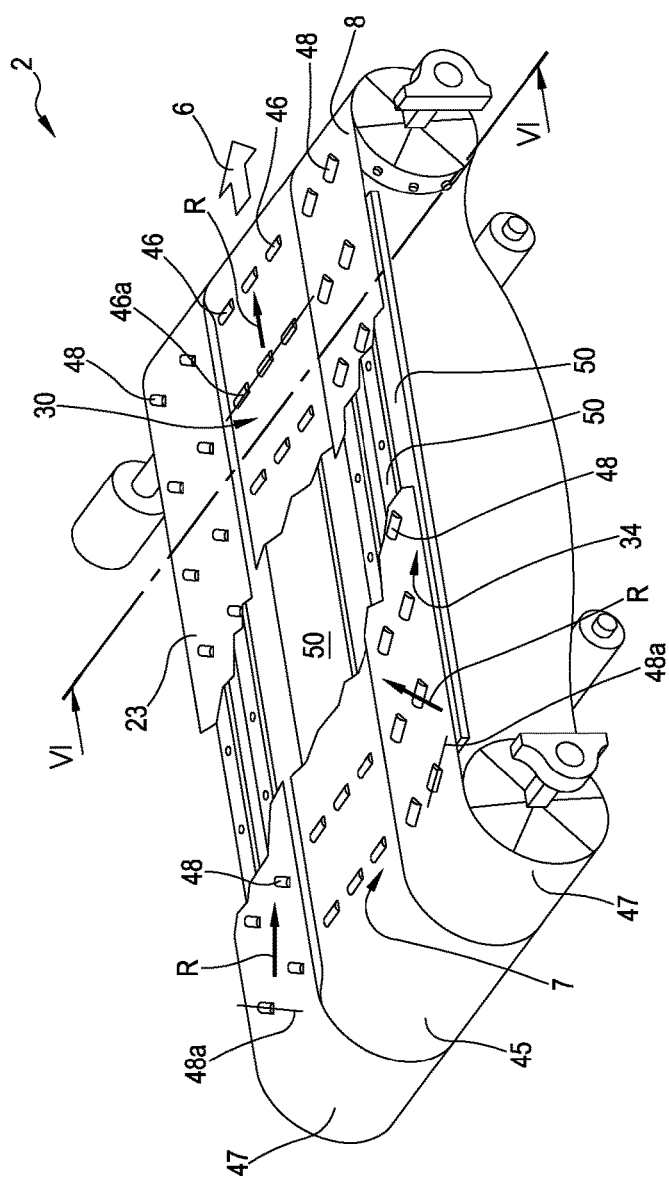
FIG. 5 illustrates a possible further variant of the converger module.

In a further variant, illustrated for example in FIGS. 4 and 5, the conveyor 30 may consist in a suitable belt 45 which bears a plurality of free rollers 46 rotating about their own axis 46a and which are appropriately positioned in respective cavities of the belt.

In other words, the belt 45 will be made to advance along the indicated direction and the respective rollers 46 borne by the belt 45 will impart to the articles 5 resting thereon a movement that depends on the orientation of the rollers themselves. In particular, as shown in FIG. 5, the rollers 46 in the first zone 7 will be orientated in such a way as to impart only a movement R directed along the main advancement direction 6 towards the outlet station 4.

With reference to the second zone 8 of the converger module 2, it can be seen that the second zone 8 includes at least a conveying element 34 and in general a plurality of conveying elements for defining substantially a roller conveyor 35 whose rollers have an axis that is inclined relative to the main advancement direction 6 so as to impart the advancement motion towards the outlet station 4, and also the lateral movement 9a towards the first zone 7 (resultant R).

The figures show rollers orientated substantially in the same direction, with axes thereof parallel to each other and also equidistant.

However, it should be noted that the above configuration is disclosed and illustrated solely by way of example, as variously spaced rollers might well be used, respectively inclined in a more or less accentuated manner relative to the main advancement direction 6.

The geometry of these rollers, generally cylindrical, can also be varied so as to vary the pushing forces on the articles 5. Purely by way of example, a truncated cone shape could also be used for the geometry of the lateral surface of the rollers. The third zone 23 of the converger module 2 also comprises at least one respective conveying element 36 and in general a plurality of the elements 36 suitable for defining a respective roller conveyor 37 whose rollers have an axis that is inclined relative to the main advancement direction and is able to impart the advancement motion towards the outlet station 4 and also the lateral movement 9b towards the first zone 7 of the module (resultant R).

In other words, the two roller conveyors 35 and 37, which in particular will have the same transversal and longitudinal dimensions, will be suitable for supportingly receiving the articles 5 and directing them towards the conveyor belt or central conveyor 30.

In this case, too, an alternative embodiment of the roller conveyors 35, 37 is illustrated in FIGS. 4 and 5.

As with the first zone 7, each of the two lateral zones 8, 23 may be formed by a respective conveyor belt 47 affording the appropriate seatings within which a plurality of rollers 48 are mounted.

As previously mentioned, the axis of inclination 48a of the rollers will be such as to define the forces applied on the articles placed on them.

In particular, by appropriately tilting the axis of rotation relative to the advancement direction of the belts 47 the articles 5 can be directed in such a way that movements are imparted to them along the main advancement direction 6 and also along a direction perpendicular thereto, so that they are directed, with a lateral movement 9a, 9b, towards the first zone 7 of the converger module (resultant R).

Figure 11:
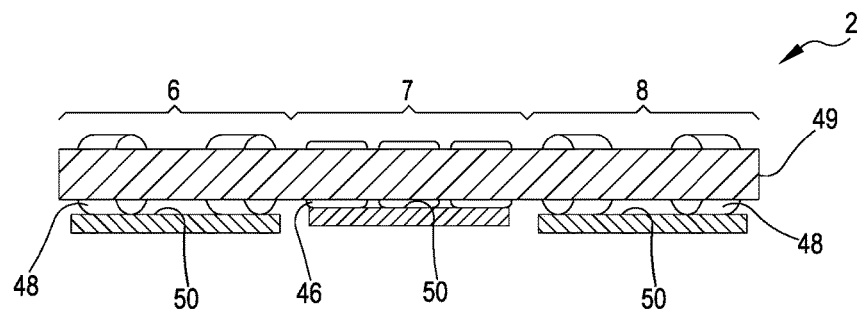
Figure 12:
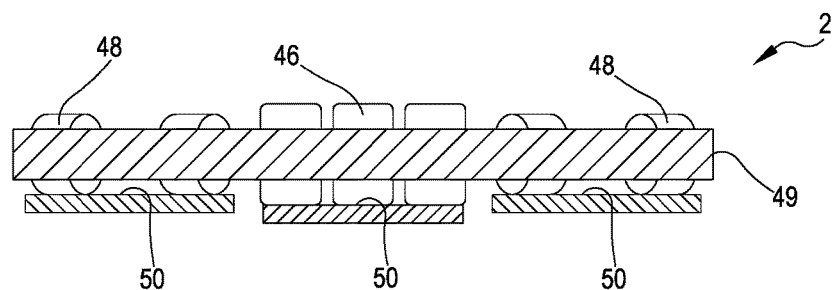

It should also be noted that the conveyor belts 45, 47 supporting the rollers 46, 48 may be separate and distinct (FIG. 5) or even a single belt 49 (FIGS. 11 and 12) in which the various movements are imparted exclusively by mounting the idle rollers 46, 48 and directing the axes 46a, 48a as deemed appropriate.

It should also be noted that the motion of the rollers can be imparted in accordance with various embodiments, for example by making them roll (thanks to the motion of the belts they are mounted on) on surfaces 50 suitable for generating the rotation of the rollers due to the friction that is created.

Figure 6:
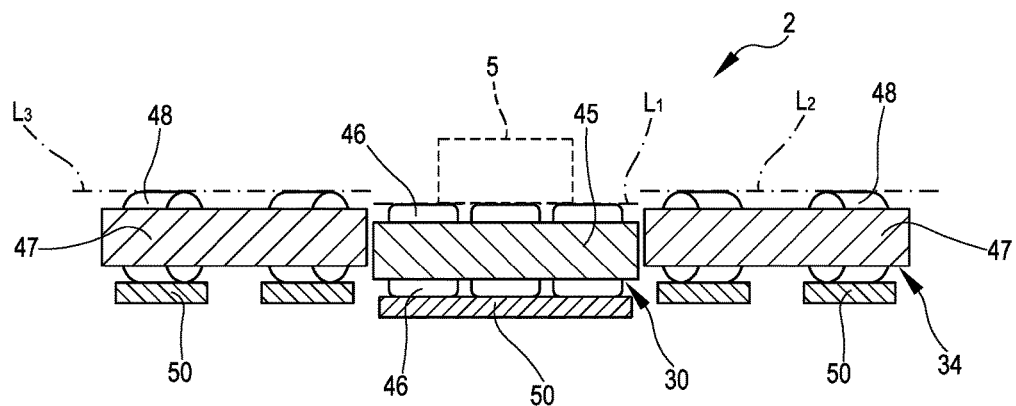
FIG. 6 shows a cross section of the converger module of FIG. 5.

In a possible configuration that has certain advantages, the first zone 7 can be placed at a lower average level $L_1$, equal to or greater than $L_2$, $L_3$, of the corresponding second zone 8 and/or the corresponding third zone 23 of the converger module 2. In particular, FIG. 6 illustrates a situation in which the first zone 7 is at a level $L_1$ that is lower than both the second zone 8 and the third zone 23.

Figure 7:
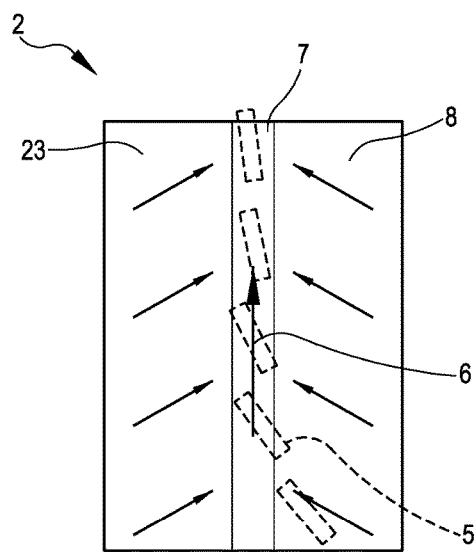
FIGS. 7 and 8 schematically show the different behaviour of the module of FIGS. 4 and 5.
Figure 8:
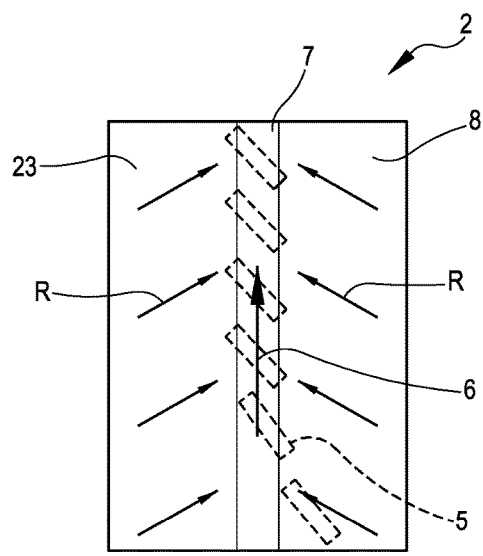

The difference in effects with respect to planar zones is shown in FIGS. 7 and 8, which show that the presence of a lowered central zone 7 enables articles 5 of small transversal dimensions to be conveniently received and directed along the advancement direction 6 without any need for further intervention on the part of the device.

Figure 9:
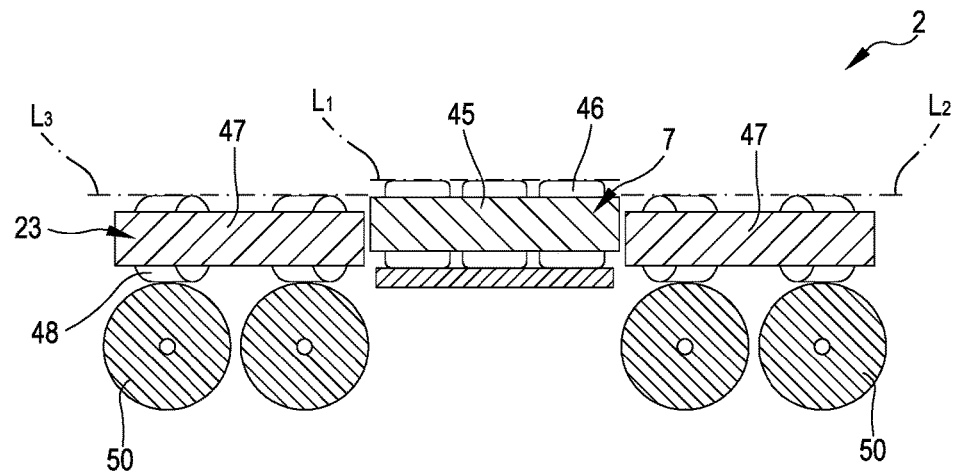
FIGS. 9, 11 and 12 are section views of three different embodiments of the converger module.

FIG. 9 shows the opposite situation where the first zone 7 lies in an average plane $L_1$ (rest surface for the articles) that is greater than the average plane $L_2$, $L_3$ defined by the second zone 8 and/or the third zone 23.

Figure 10:
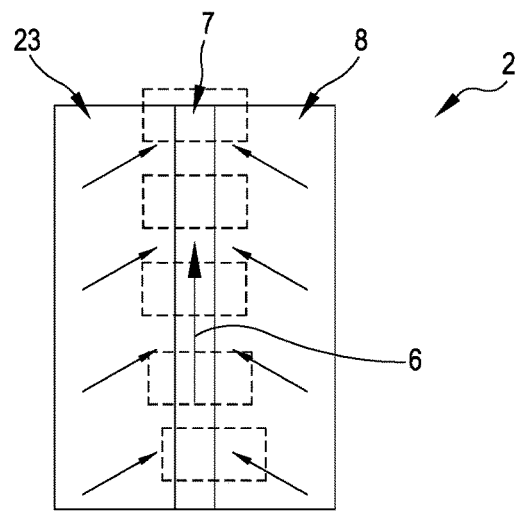
FIG. 10 schematically shows the functioning of a module according to FIG. 9.

In this case the effect is illustrated in FIG. 10, where it can be observed that in the presence of articles having larger transversal dimensions than the first zone 7, the positioning thereof is improved.

It should be noted, moreover (FIGS. 11 and 12), that the different heights of the first zone 7 relative to the adjacent zones 8, 23 can be obtained using a same conveyor belt 49 and by varying the heights of the individual rollers 46, 48 constrained to the belt.

Obviously, the above-described effects can also be obtained with the roller conveyors and the conveyor belt, by appropriately selecting the respective planes in which the articles rest/lie. Alternatively, roller conveyors having axes perpendicular to the direction 6 can be used in the second and third zones 8, 23, said roller conveyors being inclined, however, relative to the horizontal plane, towards the first zone 7 so that gravity defines the push towards the first zone 7, while the roller conveyors direct the articles exclusively towards the outlet station 4.

A diverger module 10 is positioned following the converger module 2.

The accompanying figures represent, by way of non-limiting examples, the two modules 2, 10 consecutively arranged and immediately adjacent, i.e. without gaps or spaces between them. However, it will be possible in any case to envisage the presence of intermediate transfer modules which do not influence the subsequent behaviours and operations of the diverger module. In any event, the articles 5 handled by the converger module 2 are infed to the diverger module 10 at a respective inlet station 11.

The diverger module 10, in general terms, also has a first zone 13 configured to receive the articles from the first zone 7 of the converger module 2 and to impart to the articles resting thereon an advancement motion along the main advancement direction 6.

In this case too, the first zone 13 of the diverger module 10 has, by way of non-limiting example, a rectangular profile when viewed from above, with the two longer sides parallel to the main advancement direction 6 and the opposite shorter sides positioned at the inlet and outlet stations 11 and 12.

The first zone 13 of the diverger module will also be intended solely to impart this motion along the main advancement direction 6 from the inlet station 11 to the outlet station 12.

The first zone 13 is generally defined by a respective conveyor 31, such as a conveyor belt, which can have and assume the same configurations as the conveyor belt or previously mentioned conveyor 30 belonging to the converger module 2.

In particular, it can alternatively consist of a plurality of conveyor belts arranged in series along the advancement direction, or even, in an alternative embodiment, consist of the belt 51 having rollers 52 mounted idly and intended to impart the force R and the direction of advancement of the articles resting thereon.

It should be noted that in general, although not necessarily, both the conveyor 30 of the converger module and the conveyor 31 of the diverger module 10 are configured to define, in cooperation with an article 5, a predetermined coefficient of friction that is greater than the respective coefficient of friction defined by the adjacent areas of the converger module 2 and diverger module 10. In fact, the same article 5 advancing in the first zones 7 and 13 will determine, in cooperation with the latter, a coefficient of friction that is greater than the coefficient of friction that the article 5 can determine with the various zones of the converger and/or diverger module. In the discussion that follows, to identify such zones reference will be made, by way of non-limiting example, to zones having a high coefficient of friction, whereas for the adjacent zones reference will be made to zones having a low coefficient of friction.

In this way, it is ensured that an article 5, partially resting in the first zone 7 of the converger module 2 or the first zone 13 of the diverger module 10, will mainly receive the motion imparted by the zone itself and will therefore be exclusively directed along the main advancement direction 6.

Once again from a general point of view, the diverger module 10 comprises a second zone 14 flanking the first zone 13 along the advancement direction 6.

The second zone 14 extends between the inlet station 11 and the outlet station 12 and is defined, in a plan view, by a rectangular profile with the longer sides disposed parallel to the main advancement direction 6 and opposite shorter sides located at the inlet station 11 and the outlet station 12. In particular, the second zone 14 extends along a prevalent plane of extension which, under conditions of use of the singulator 1, is situated horizontally.

The second zone 14 is configured to impart, to the articles resting thereon, an advancement motion along the main direction 6 and a lateral movement 15a away from the first zone 13 (resultant R).

As can be seen from FIGS. 32 to 42, the first zone 13 of the diverger module 10 projects, at least for a portion of its overall length (between the inlet station 11 and outlet station 12), away from a prevalent average plane of extension of the second zone 14 in the direction of the articles 5 to be supported, in order to define an ascent zone 15 of the diverger module 10.

In greater detail, in a preferred, but non-limiting embodiment, the ascent zone 15 comprises at least an ascending ramp 44a and a descending ramp 44b consecutively disposed along the advancement direction 6. The ascending ramp 44a extends, by way of non-limiting example, along a prevalent direction of extension which defines, with the prevalent average plane of extension of the second zone 14, a subtended angle comprised between 3° and 30°, in particular between 3° and 25°, and more in particular between 5° and 20°.

In a preferred, but non-limiting embodiment, the first ramp 44a extends inside an initial portion of the first zone 13 comprised within 50% of the total extent of said first zone 13, in particular within 30% of said first zone 13.

In the latter configuration described, the maximum difference in height of the ascent zone 15 is defined in the first 50% of the total extent of said first zone 13, in particular in the first 30% of said first zone 13.

With regard to the descending ramp 44b, the latter also extends, by way of non-limiting example, along a prevalent direction of extension which defines, with the prevalent average plane of extension of the second zone 14, a subtended angle comprised between 3° and 30°, in particular between 3° and 25°, and more in particular between 5° and 20°.

FIGS. 30 to 42 illustrate, by way of non-limiting example, an embodiment in which the ascending ramp 44a and descending ramp 44b are immediately consecutively disposed along the advancement direction 6 (i.e. there are no intermediate sections connecting said ramps 44a and 44b). In this condition, the ascent zone defines, according to a longitudinal cross section, a substantially triangular profile (see for example the lateral FIGS. 31, 33, 35, 37, 39 and 41).

Alternatively, the ascent zone may comprise at least a connecting section interposed between the ascending ramp 44a and descending ramp 44b (condition not illustrated in the accompanying figures) and extending, for example, along a trajectory that is prevalently arch-shaped or rectilinear.

From a dimensional standpoint, the ascent zone 15 defines, with the second zone 14, a maximum difference in height greater than 2 cm, in particular comprised between 2 cm and 10 cm, even more in particular between 2 cm and 6 cm.

The accompanying figures represent, by way of non-limiting example, a condition in which the difference in height defined by the ascent zone 15 is generated by the inclination of the ramps 44a and 44b relative to the second zone 14, which, under the conditions of use of the singulator 1, extend horizontally. However, the difference in height between the ascent zone 15 and the second zone 14 can also occur in the event that the latter is inclined downward relative to a horizontal plane (condition of use of the singulator 1), whereas the ascent zone extends horizontally (condition not illustrated in the accompanying figures).

Overall it is possible to identify a difference in height between the ascent zone 15 and the second zone 14 in conditions wherein the first ramp 44a defines, under conditions of use of the singulator 1, relative to a horizontal plane, a subtended angle that is greater than the subtended angle which the second portion defines with said horizontal plane.

The fact of including an ascent zone 15 in the diverger module 10 serves to ensure the separation (singulation) of the incoming articles in any configuration. In greater detail, the ascent zone 15 is particularly useful in cases where two or more articles 15 arriving from the converger module 2 are in a superimposed condition (one on top of the other). A normal singulator 1, having a first zone 13 that is coplanar with the adjacent zones, would not enable the articles 5 to be singulated in the latter described condition. In fact, the article 5 moving in the central zone 13 could exert upon an underlying article 5, in particular which it at least partially overlaps, a force tending to squash the latter and substantially prevent the zones adjacent to the first (central zone 13) from moving the article 5 away from the first zone, thus compromising the singulation thereof.

The movement of the superimposed articles 5 in motion on the diverger of the present invention can be clearly seen in FIGS. 31 to 42.

The difference in height created by the ascent zone 15 enables the first zone 13 to place the advancing articles 5 on the different level thereon relative to the articles advancing in the adjacent zones, i.e. the zones 14 and 24; in this condition, should there be superimposed articles, one avoids squashing and consequently holding back articles advancing in the second and fourth zones 14, 24.

In short, the ascent zone 15 ensures that the articles 5 will slide on a level that is different from the level defined by the second and fourth zones 14, 24, thus avoiding, at least in that section, an interference of the articles 5 along a direction that is transversal, in particular perpendicular, to the plane of extension of the second and fourth zones 14, 24 (vertical direction in the condition of use of the singulator 1).

As can be seen from the accompanying figures, the diverger module further has a third zone 16 flanking the second zone 14 along the main advancement direction 6 on the side opposite to the first zone 13.

In still other words, the second zone 14 of the diverger module 10 is interposed between and contiguous to the first zone 13 and the third zone 16, as shown in the accompanying figures. The third zone 16 is configured so that articles positioned therein are conveyed only along the advancement direction 6 until they reach the outlet station 12.

The third zone 16 could begin anywhere between the inlet station 11 and the midpoint of the outlet station 12, as the converger module 2 will have brought the articles to the centre of the singulator.

It should also be noted that the diverger module 10 shown in FIG. 1 also has a fourth zone 24 extending between the inlet zone 11 and the outlet station 12 and flanking the first zone 13 along the main advancement direction 6 on a side opposite to the second zone 14.

In a plan view, the fourth zone 24 also exhibits a rectangular profile with sides prevalently extending parallel to the main advancement direction 6 and opposite shorter sides positioned at the inlet station 11 and the outlet station 12.

The fourth zone 24 is configured to impart to the articles resting thereon an advancement motion along the main advancement direction 6 and a lateral movement 15b away from the first zone 13.

In other words, the lateral movement 15*a*, 15*b* imparted by the second zone 14 and the fourth zone 24 have the same direction but are respectively directed in the opposite way away from the first zone 13.

From a structural standpoint, the fourth zone 24 is substantially equal to the second zone 14 and in fact symmetrical to the latter relative to the zone 13: for these reasons, the ascent zone 15 projects equally from the fourth zone 24, thus defining the same difference in height.

In this case, too, the second zone 14 and fourth zone 24 of the diverger module 10 comprise at least one respective conveying element 34, 36 and in particular a plurality of elements 34, 36 such as to define respective roller conveyors 35, 37 whose rollers have an axis that is inclined relative to the main advancement direction 6 so as to impart the above-mentioned advancement motion towards the outlet station 4 and the lateral movement 15*a*, 15*b* away from the first zone 13 of the diverger module 10.

Figure 15:
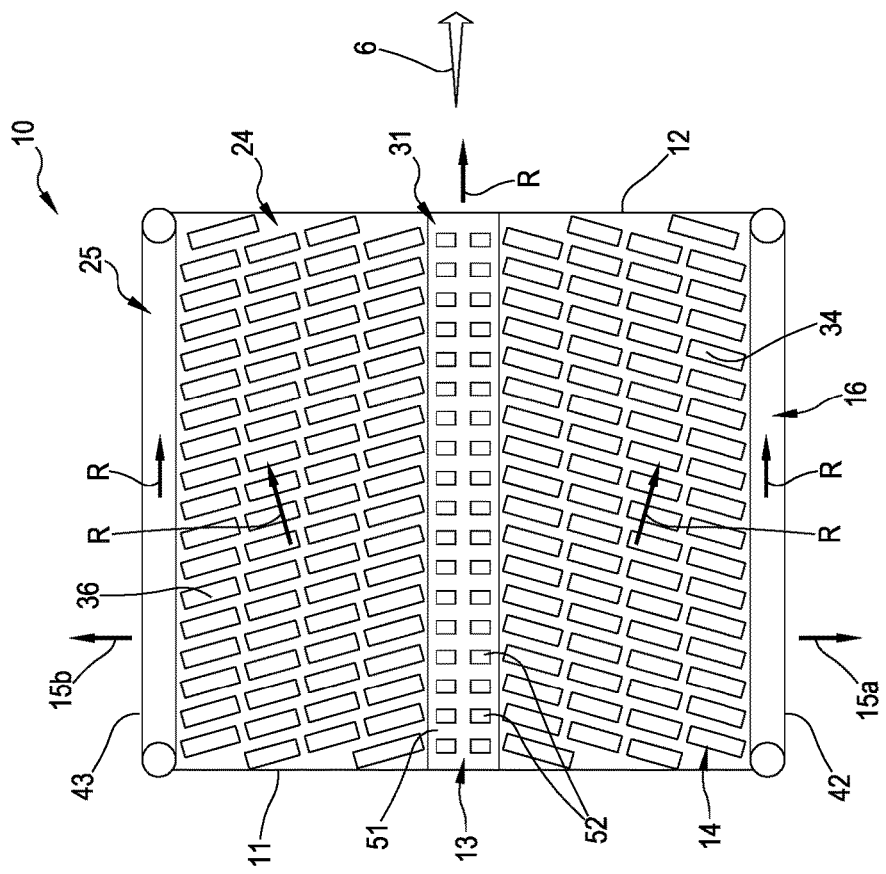
Figure 16:
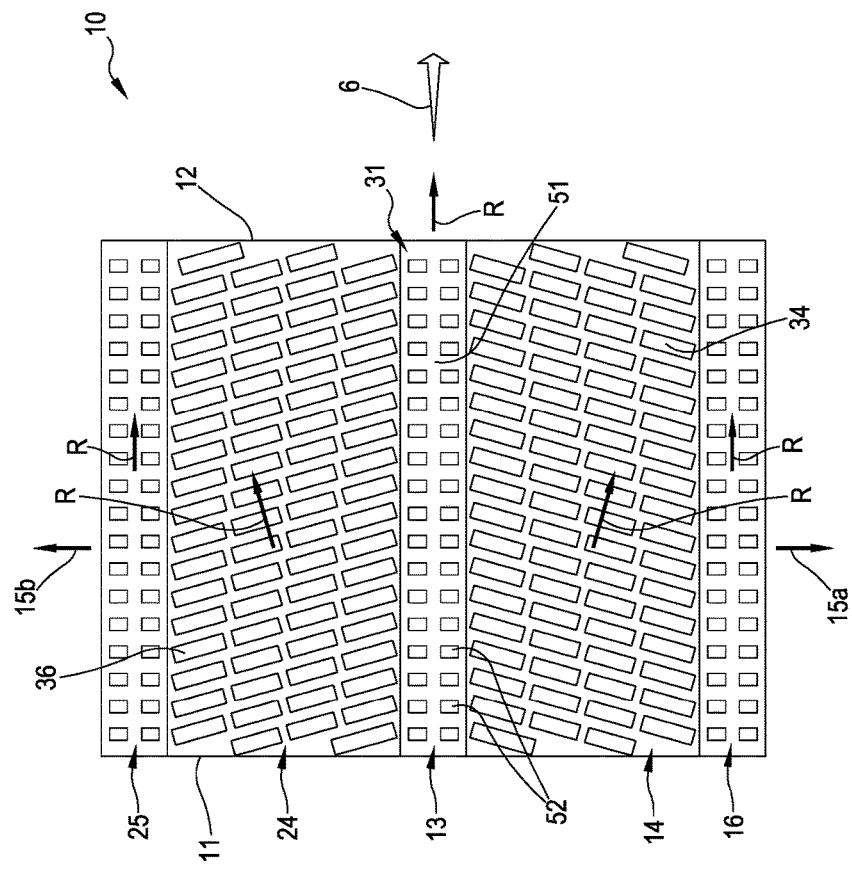

As previously mentioned, the illustration is by way of non-limiting example and therefore the roller conveyors 35, 37 can be realised with axes inclined relative to the advancement direction in manner differing from the one illustrated, also differing from roller to roller and with a plurality of rollers having a cylindrical and/or truncated cone shape, and it will also obviously be possible to configure the second and the fourth zone of the diverger module using conveyor belts which have rollers mounted idly in respective cavities in the belts so as to impart the movements forward and away as previously described (FIGS. 15 and 16).

In the latter case, the second and fourth zones 14, 24 will be structurally similar to the representations in FIGS. 4 to 12, the only difference being tied to the orientation of the axis of the rollers for generating the component 15*a*, 15*b* of moving away. Alternatively, in the second and fourth zones 14, 24, too, use can be made of roller conveyors having an axis perpendicular to the direction 6, but which are inclined relative to the horizontal plane in a direction away from the first zone 7, so that it is gravity which defines the component of pushing towards the third and fifth zones 16, 25, while the roller conveyors direct the articles exclusively towards the outlet station 12. The diverger module 10 further comprises at least a fifth zone 25 flanking the fourth zone 24 along the advancement direction 6 on the side opposite to the first zone 13.

In this case, too, the articles in the fifth zone 25 are conveyed exclusively along the advancement direction 6 to the outlet station 12 (resultant R).

The fifth zone 25 could begin anywhere between the inlet station 11 and the midpoint of the outlet station 12, as the converger module 2 will have brought the articles to the centre of the singulator.

It should be noted that the third and the fifth zones 16, 25 of the diverger module 10 might be formed by a respective lateral wall 42, 43 which projects from an average plane of the diverger 10 (FIGS. 1, 3, 15 and 30).

In particular, in the case of the third zone 16 of the diverger module 10, the lateral wall 42 will project from the average plane of the zone 14 and will be configured so as to supportingly receive the articles 5 pushed by the second zone 14 away from the first zone 13 and configured so as to enable conveyance along the main advancement direction 6 towards the outlet station 12. In a preferred, but non-limiting embodiment, the lateral wall 42 extends longitudinally from a first end substantially disposed at the inlet station 11 and a second end substantially disposed at the outlet station 12. Advantageously, the second end of the lateral wall is at a distance from the first zone 13 that is less than the distance between the second end and said first zone 13: in this condition, the lateral wall 42 is divergent relative to the advancement direction 6. As can be seen from FIG. 30, the lateral wall 42, at the first end thereof, has a connecting portion or an arch-shaped portion suitable for facilitating the arrival of articles from the converger module 2. Preferably, the lateral wall 42 can be adjusted in position relative to the first zone 13; in particular it is adjustable in both inclination and distance relative to the first zone 13. In order to adjust the lateral wall 42, the singulator comprises an activating device, namely, an electric motor or a piston suitable for moving the wall 42.

Preferably, by way of non-limiting example, the lateral wall 43 is identical to the lateral wall 42 and positioned symmetrically to the latter relative to the first zone 13.

The lateral walls 42, 43 can consist of respective conveyor belts wherein the axis of rotation of the rollers on which they move is disposed perpendicular to the surface constituting the first, second and fourth zones of the diverger module; in other words, the belt will project vertically from the average plane of the diverger module.

In addition, the lateral walls 42 and 43 can generally be motorized so as to actively impart the motion towards the outlet station 12.

Obviously, the fifth zone 25 of the diverger module 10 will comprise the respective lateral wall 43 in a completely symmetrical and mirror-like manner relative to what was described above with reference to the lateral wall 42.

Figure 13:
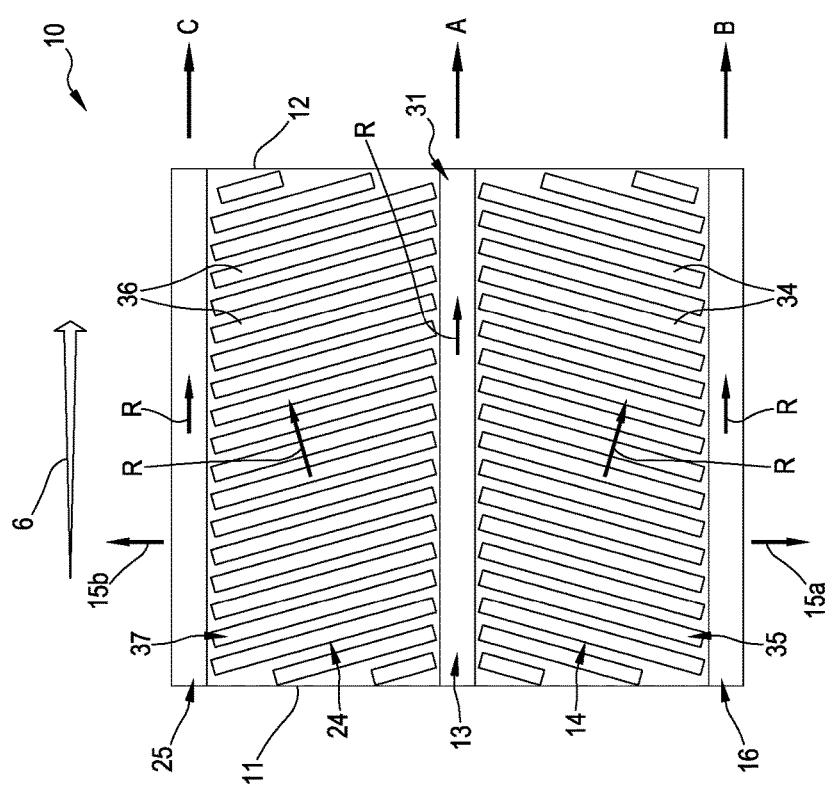
FIGS. 13-16 illustrate four possible variants of the diverger module.

In an alternative embodiment illustrated in FIG. 13, the lateral walls 42 and 43 in the third zone 16 and the fifth zone 25 of the diverger module 10 may be replaced by the respective conveyor belts (in the same plane), for example with high friction and able to move the articles 5 which might arrive resting thereon exclusively along the main advancement direction 6.

Figure 14:
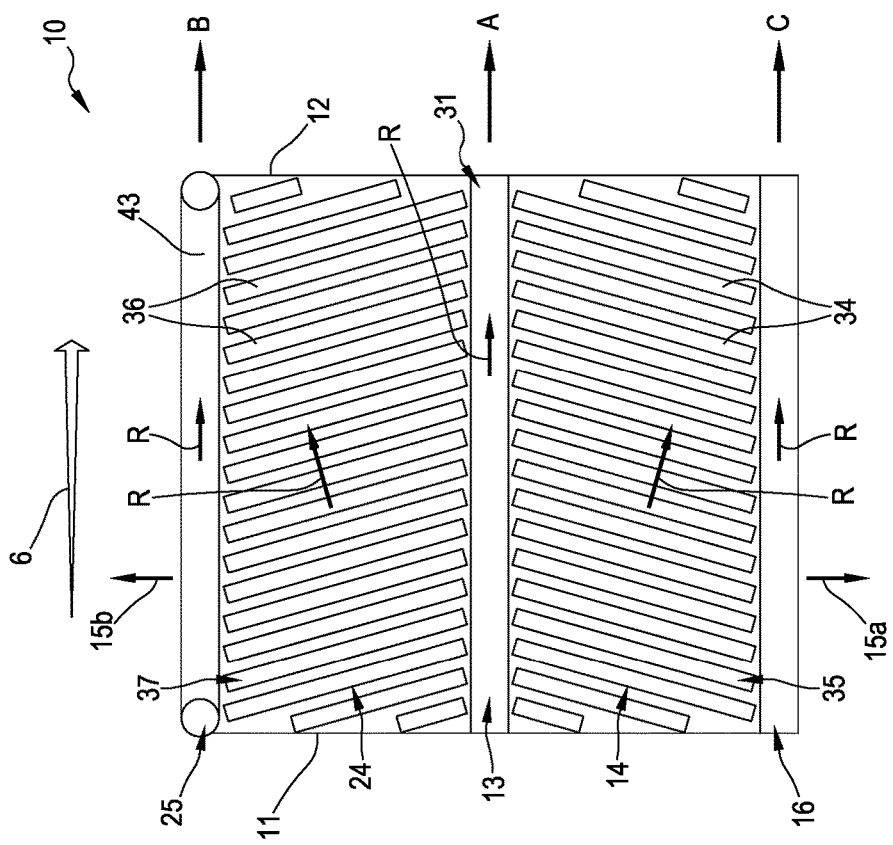

According to a further alternative (FIG. 16) the conveyor belts may be replaced by conveyor belts having seatings with rollers mounted idly and suitable for directing the articles resting thereon exclusively in the main advancement direction 6. Combinations of the above solutions will also be possible, see for example FIG. 14 in which a projecting lateral wall 43 and a conveyor belt on the opposite side are used.

Observing the singulator shown in FIG. 1, one may note the presence of a selector module 17 located downstream of the diverger module 10 along the main advancement direction 6. As per the previous description, the selector module 17, too, is illustrated immediately downstream of and disposed consecutively relative to the diverger module 10.

However, an intermediate transfer module might be present, which could still enable the selector module 17 to function optimally without going outside the scope of the inventive concept as described.

In any case, the selector module 17 extends between a respective inlet station 18 and an outlet station 19 and has a respective first zone 20 configured to receive the articles arriving from the zone 13 of the diverger module 10 and to impart to the articles resting thereon an advancement motion exclusively along the main advancement direction 6 from the inlet station 18 to the outlet station 19.

The selector module 17 further has a second zone 21 configured to receive the articles arriving from the third zone 16 of the diverger module 10 so as to impart, to the articles resting thereon, an advancement motion along the main advancement direction 6 (exclusively) from the inlet station 18 to the outlet station 19.

Furthermore, the selector module 17 could also comprise a third zone 26 configured to receive the articles arriving from the fifth zone 25 of the diverger module 10 so as to impart, to the articles resting thereon, an advancement motion exclusively along the main advancement direction 6 from the inlet station 18 to the outlet station 19.

FIG. 1 illustrates the presence of a plurality of independent conveyor belts that define the direction of advancement of the articles positioned parallel to the main advancement direction 6. As an alternative to conveyor belts, roller conveyors or rollers having axes perpendicular to the advancement direction can likewise be used, as can conveyor belts provided with cavities suitable for mounting idle rollers which direct the articles as mentioned above.

Figure 17:
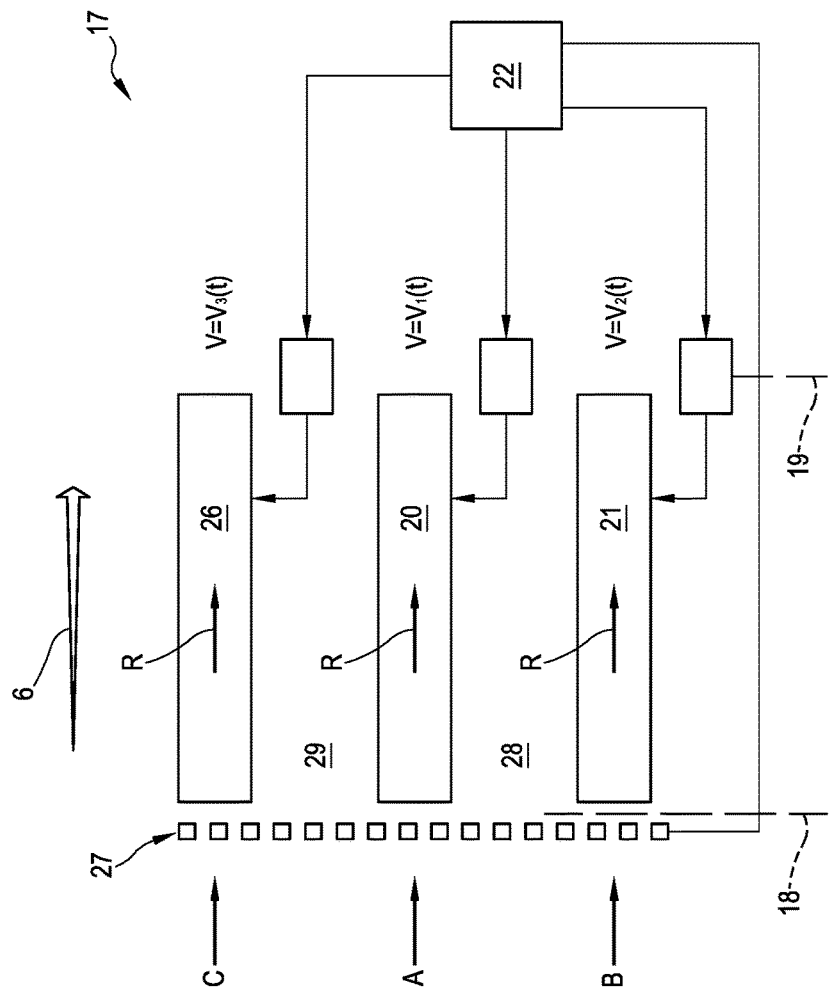
FIGS. 17 and 18 illustrate two possible variants of the selector module.
Figure 18:
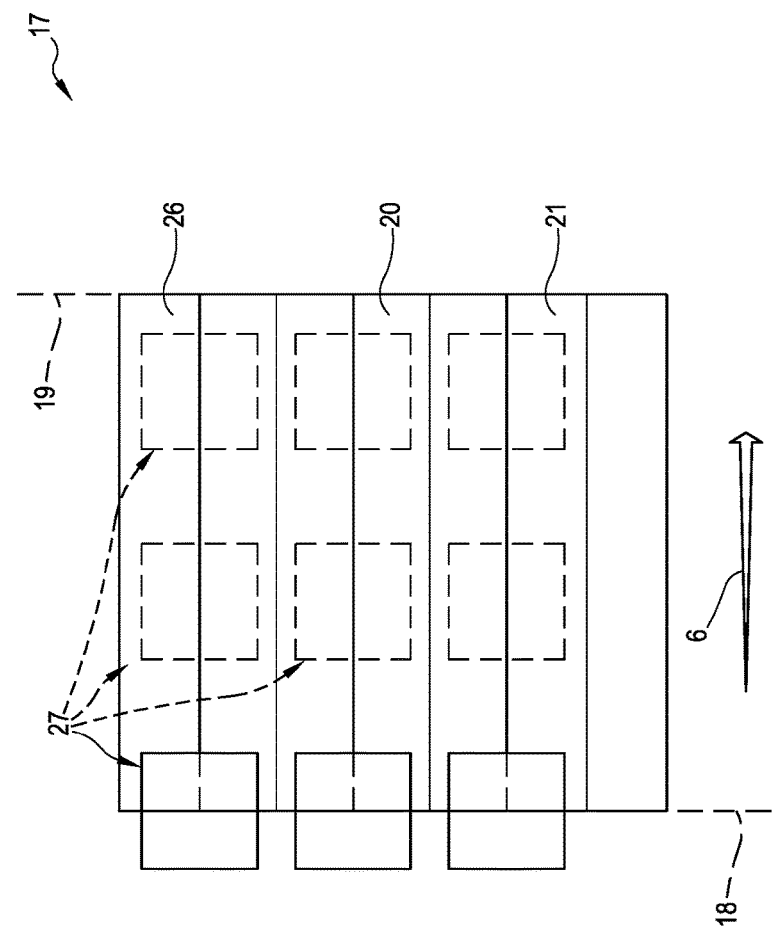

Furthermore, the selector module 17 can be configured to comprise only moved conveyor belts positioned in the zones intended to receive the products exiting the diverger module 10 (FIG. 17), or also a plurality of conveyor belts all moved independently of one another and placed side by side so that a control unit 22 can appropriately control the movement thereof (FIGS. 1 and 18). FIG. 1 illustrates the situation of a plurality of conveyor belts side by side; FIG. 17, on the other hand, illustrates a situation in which the selector module 17 comprises a fourth zone 28 flanking and interposed between the first and second zones 20, 21 along the main advancement direction 6 and a fifth zone 29 flanking and interposed between the first and the third zones 20, 26 along the main advancement direction 6.

The fourth and fifth zones 28, 29 according to this specific embodiment extend from the inlet station 18 to the outlet station and comprise surfaces that are not moved, for example exhibiting low friction.

As can be observed from the accompanying FIG. 17, the device also includes a control unit 22, which is active at least on the first zone 20 of the selector module 17 so as to impart the advancement motion along the main advancement direction 6 with an initial speed profile, and is also active at least in the second zone 21 of the selector module 17 so as to impart the corresponding advancement motion along the main advancement direction 6 with a second speed profile which can also be different from the first speed profile.

The control unit 22 will also be active in the third zone 26 of the selector module so as to impart thereon an advancement motion along the main advancement direction 6 with a third speed profile that can be different from both the first and the second speed profiles, as will be better explained below.

In detail, and as shown in the accompanying figures, the singulator is also equipped with a detection system 27 serving the control unit 22.

This detection system 27 will be able to detect, over time, the passage of the articles 5 entering and/or in transit toward the selector module 17, at least in the first and second zones 20, 21 (and in general also the third zone 26).

Purely by way of example, there may also be a linear array of photocells along the line or the inlet station of the selector module so that the control unit 22 can receive the signal from each sensor of the detection system 27 and know the position and the passage time of the various articles 5 passing through the inlet station 18 of the selector module 17.

The above-described embodiment can only use an arrangement of photocells at least in the first, second and third zones of the selector module 17 and in general throughout the line that defines the inlet station 18 of the module itself.

Alternatively, or in combination, other types of sensors can be used, such as one or more cameras (FIG. 18) able not only to detect the shape of the product passing through the inlet station, but also to identify, for example from above, the profile of the article 5 and follow it in its advancing motion though the selector module 17 so that this type of movement can be actively controlled (see for example FIG. 18).

As mentioned, the control unit 22 receives the incoming signal/signals from the detection system 27 and uses them to determine the speed profiles to be assigned to the zones 20, 21 and 26 of the selector module 17.

In particular, the speed profiles are set in order to enable products to be outfed from the outlet station 19 of the selector module 17 in a singulated configuration, i.e. not superimposed along the transversal extent of the selector module 17. As better explained below, should two articles be in the selector module 17, for example in the first and second zones 20, 21, partially or totally superimposed if observed laterally, the control unit 22 is able to slow or stop the motion of the articles in the first zone 20 or in the second zone 21 so as to obtain the outfeed of a single product from the outlet station 19 before allowing the product present in the other zone or feed line to exit.

In other words, the speed profile is appropriately changed (even bringing the speed to 0) in order to obtain a single outfeed of the products from the three feed lines A, B, C through the outlet station 19.

With reference to the selector module 17, an extremely interesting third embodiment thereof is illustrated in FIGS. 23 to 26.

In particular, and as previously mentioned, the first zone 20 will be intended to receive the articles advancing along a main flow A, mainly coming from the first zone 13 of the diverger module 10.

In reality, this zone 20 will have transversal dimensions that are greater than those of the remaining second and third zones 21, 26 and therefore could also receive, in certain situations, articles, for example of large dimensions, from the line B or C. In any case, when observing the first zone 20, one may see that it comprises a respective conveyance device 53 provided with three conveyance surfaces 53*a*, 53*b*, 53*c* which can be distinguished at least on the basis of some structural and/or functional characteristics.

In particular, all three conveyance surfaces of the first conveyance device 53 extend from the inlet station 18 to the outlet station 19 and are, in a view from above (see FIG. 23), of an elongated rectangular shape with larger opposite sides disposed parallel to the main advancement direction 6.

These conveyance surfaces 53*a*, 53*b*, 53*c* are side by side, adjacent to one another, with the first conveyance surface 53*a* being of larger transversal dimensions (about double) than the respective transversal dimensions of the conveyance surfaces 53*b*, 53*c* (in general equal to each other); the first surface 53*a* is interposed between the further surfaces.

In general, each of the conveyance surfaces 53*a*, 53*b*, 53*c* will be an area of active conveyance surface, i.e. a mobile conveyance surface suitable for generating, in an article totally or partly resting thereon, an advancement motion directed from the inlet station 18 to the outlet station 19 along the main advancement direction.

The first conveyance surface 53*a* will have a coefficient of friction that is (much) higher than the corresponding coefficient of friction of the adjacent conveyance surfaces 53*b*, 53*c*. In other words, an article resting simultaneously on at least two of the conveyance surfaces will receive a greater push from the first conveyance surface 53a, with greater friction.

It should also be noted that the three conveyance surfaces of the first device 53 will have an equivalent advancement speed from the inlet station 18 to the outlet station 19, as they will in general be moved by a same first conveyor device 53.

In the embodiment illustrated in FIGS. 23-26, conveyance surfaces 53a, 53b, 53c are shown that are distinct and separate from one another, but which could however all be defined by a single uninterrupted surface with areas that are distinct only in terms of their coefficient of friction.

Furthermore, the example embodiment shown consists of three separate conveyor belts (endless belts) in continuous motion about at least two shafts having axes parallel to each other and arranged respectively along the lines defining the inlet station 18 and the outlet station 19.

Figure 23:
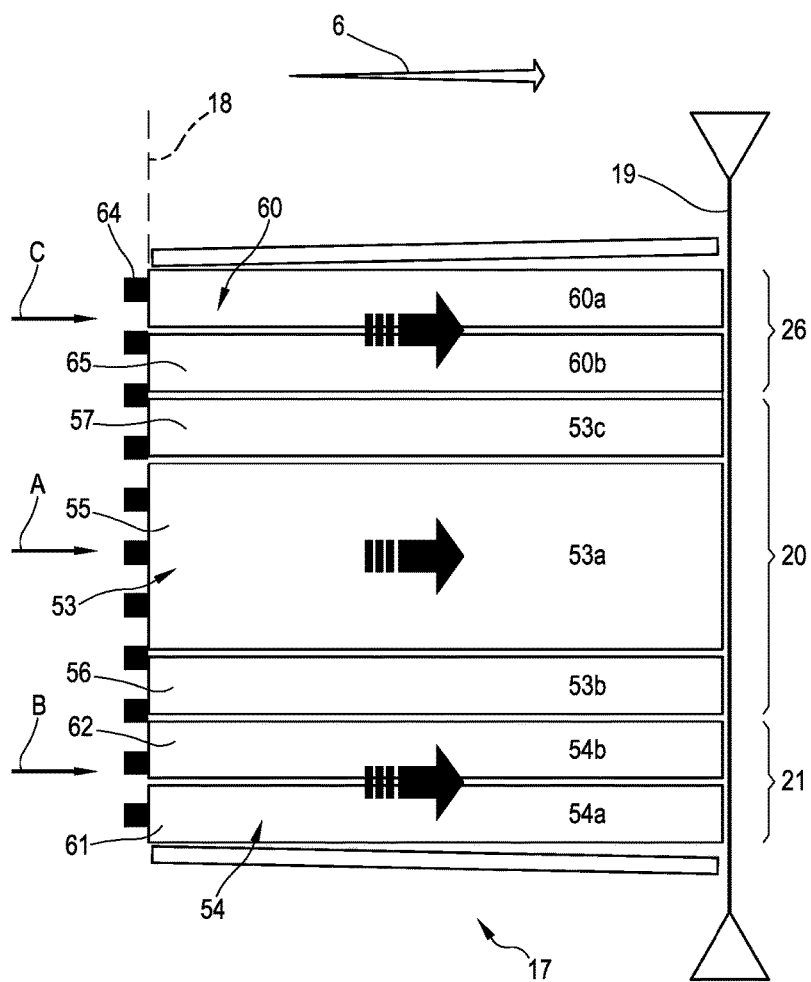
FIG. 23 is a view from above of a selector module according to an alternative and advantageous embodiment.
Figure 24:
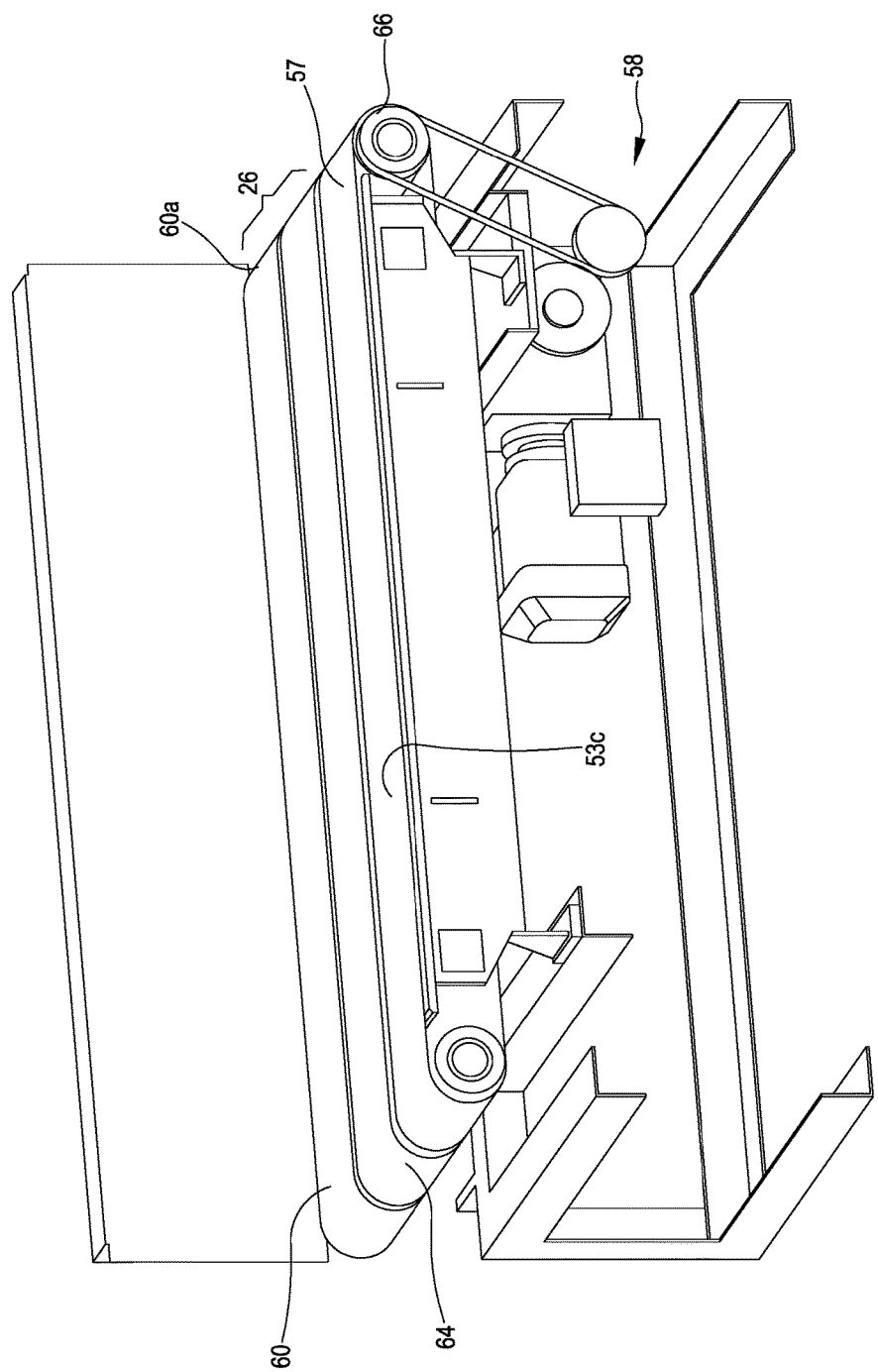
FIGS. 24, 25, 26 are further views of the selector of FIG. 23 with some parts removed in order better to illustrate others.

In still other words, each of the conveyor belts 55, 56, 57 will be placed on these two shafts so as to impart, to the upper surface, a movement indicated by the arrows in FIG. 23 and directed along the main advancement direction 6.

Figure 25:
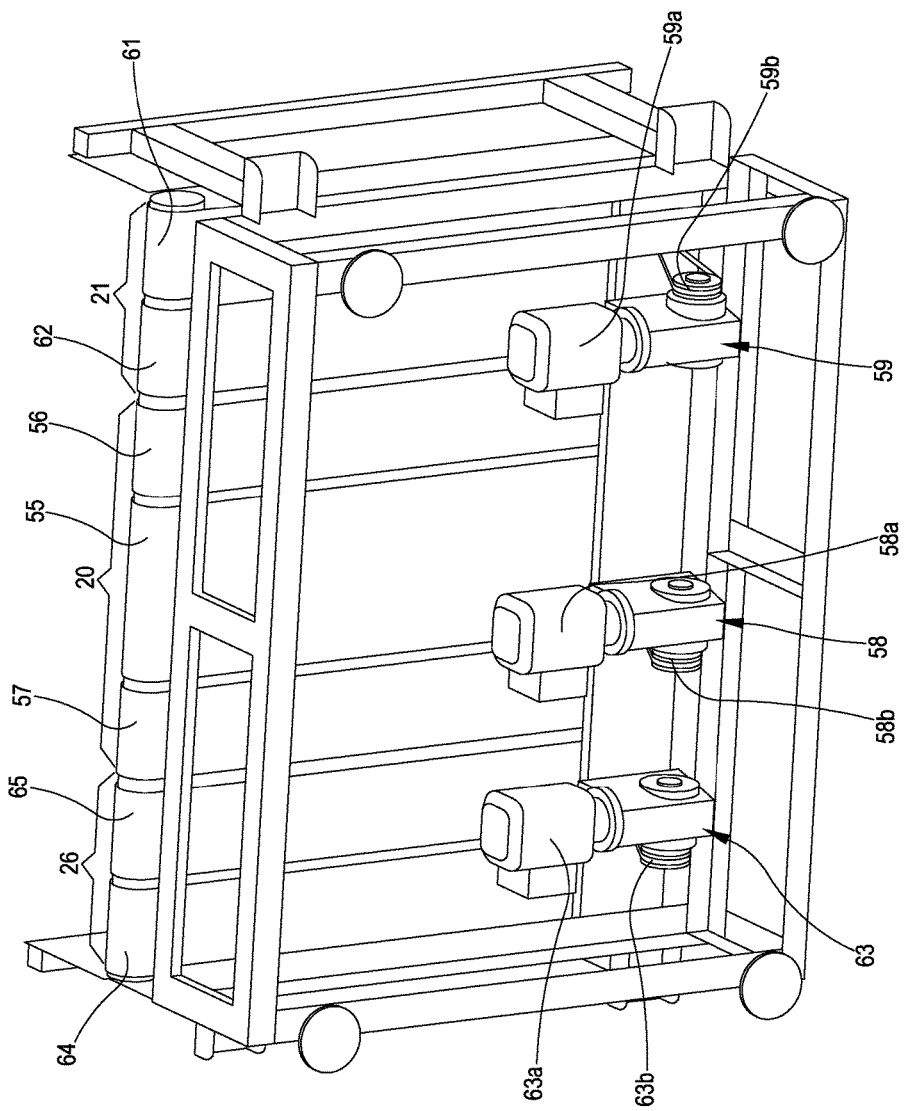
Figure 26:
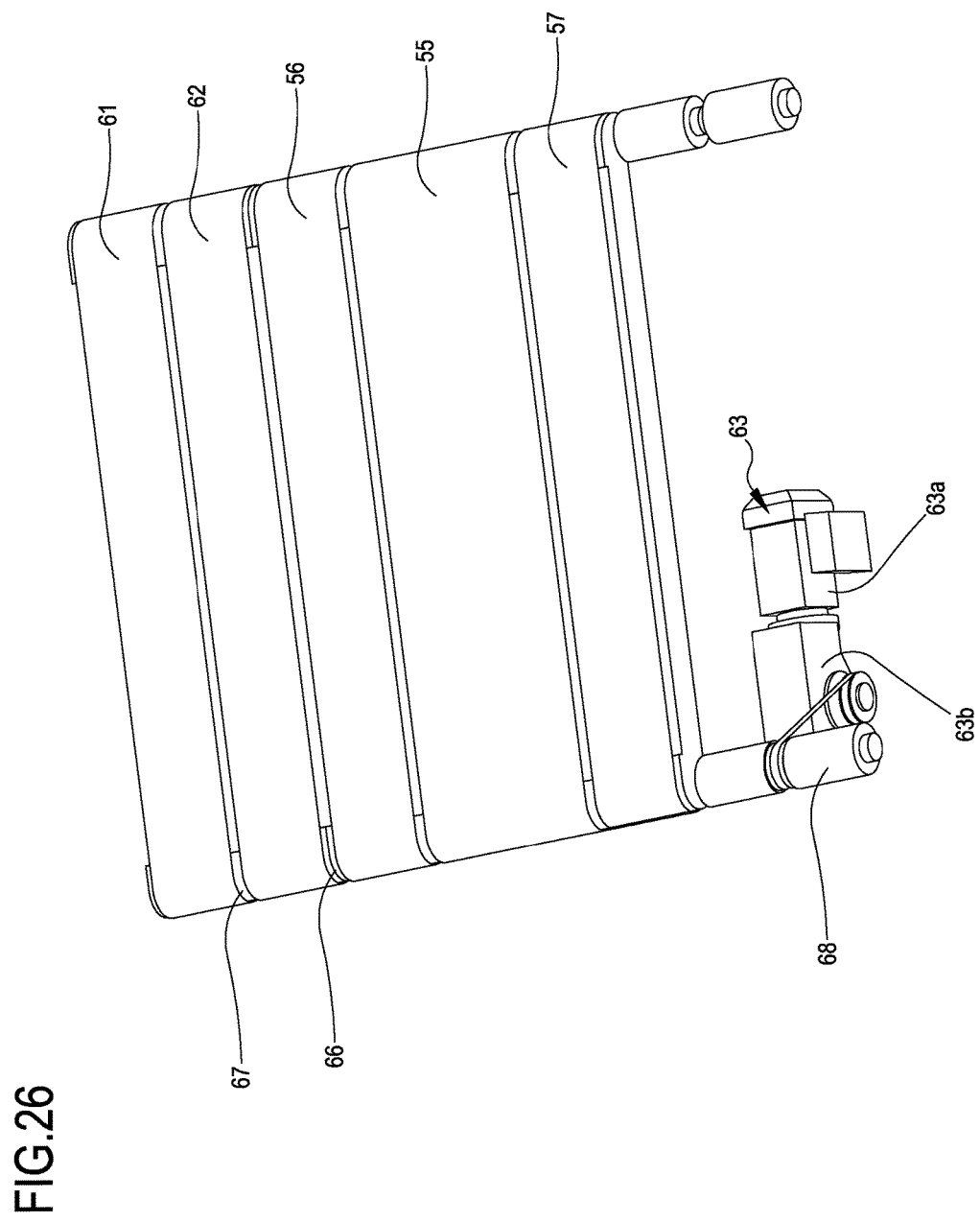
Figure 27:
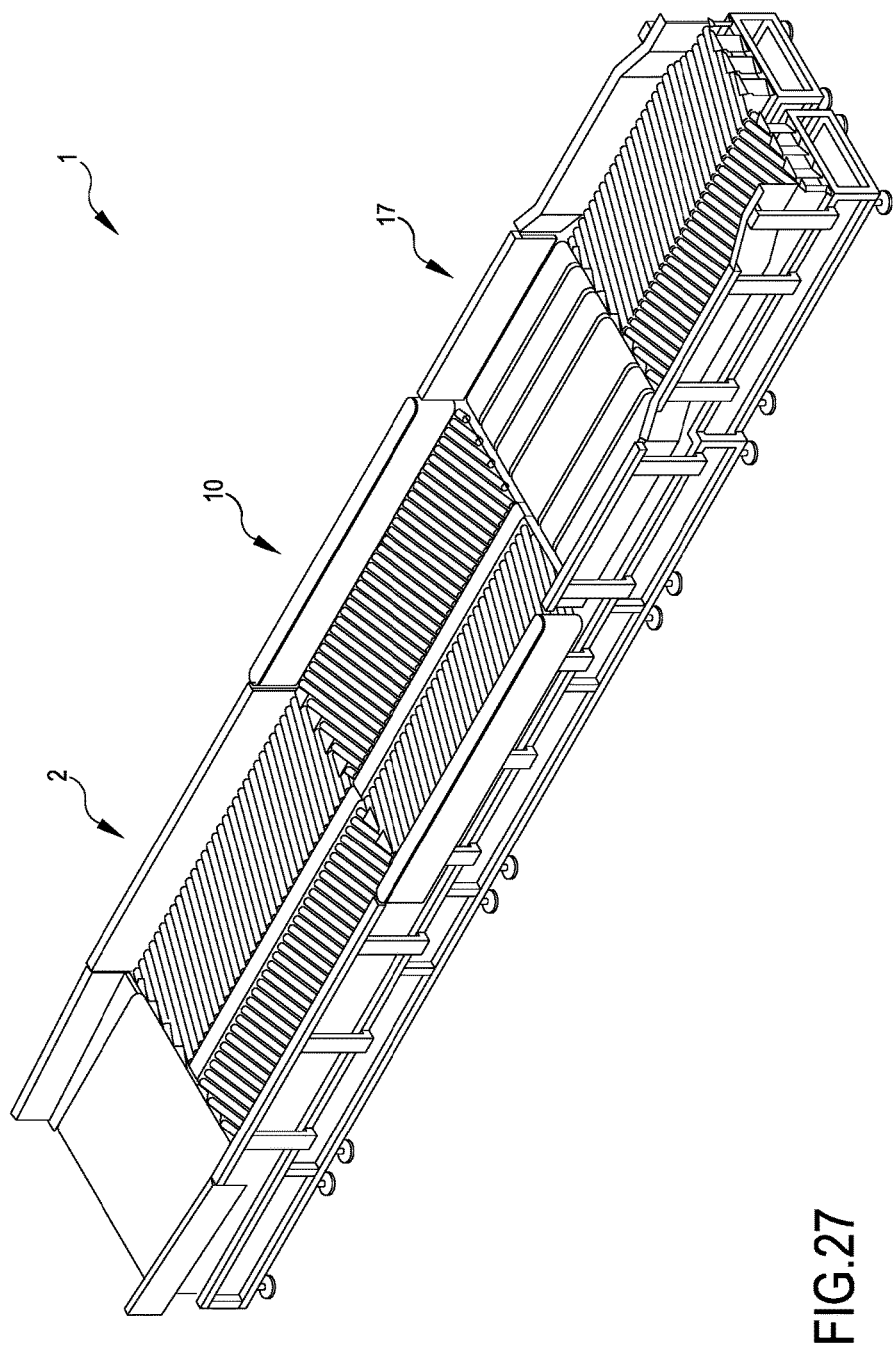
FIG. 27 is a perspective view of the singulator in a further embodiment.

From the point of view of motorisation, the first movement system 58 is shown in FIG. 25 and comprises a motor 58a and a suitable transmission 58b (such as a gear reducer) that transmits motion via a belt around a respective shaft 66, about which the conveyor belts 55, 56, 57 rotate, thus being drawn by the shaft 66 which determines a constant advancement velocity that is substantially identical for the three aforementioned belts.

Returning to the embodiment illustrated in FIG. 23, it should be noted that the second zone 21 has a second motion transmission device 54 also defined by two conveyance surfaces 54a, 54b extending from the inlet station 18 to the outlet station 19 and having a rectangular shape when viewed from above, with the opposite longer sides positioned parallel to the main advancement direction 6.

In this case, too, the conveyance surfaces 54a, 54b are positioned adjacent and side by side along the main direction of extension 6.

In particular, the second conveyance surface 54b flanks and is adjacent to the second conveyance surface 53b of the first device 53 so as to define a substantially continuous support surface for the articles arriving from the diverger module.

In this case, too, the first rest surface 54a will have a greater coefficient of friction than the second rest surface 54b. The illustrated embodiment includes two belts having substantially identical transversal dimensions, with the transversal dimensions of the second and third conveyance surfaces 53b, 53c of the first conveyance device 53 being substantially identical.

The belts are two distinct conveyor belts 61, 62, the active surface of which defines the aforementioned conveyance surfaces 54a and 54b.

In this case, too, the embodiment could consist of a single joined, uninterrupted belt that defines the two conveyance surfaces 54a and 54b with a different surface coefficient of friction.

The second conveyance system 59 shown in FIG. 25 is substantially similar (and only differently positioned in the structure of the selector module 17) to the one previously mentioned.

The system comprises a motor, for example an electric one 59a, and a transmission 59b (for example a gear reducer and a belt) which transmits motion to a shaft 67 active on the first and second conveyor belt 61, 62, previously mentioned.

Thus, in this case, too, the motion transmitted to the two conveyor belts 61, 62 will be the same with the same speed of advancement between the inlet station 18 and the outlet station 19 of the conveyance surfaces 54a and 54b.

It should be noted, however, that the motor drives of the first conveyance device 53 and the second conveyance device 54 are independent and therefore also their speed of advancement will be independent (i.e. they can also be the same at certain moments, but will in any case be controlled and managed independently by the control unit 22).

In a simpler logic control the belts could be moved at a constant speed, or, in contrast, be stationary, thus defining the speed profiles.

The selector module 17 further comprises a third conveyance device 60, also having a first conveyance surface 60a and a second conveyance surface 60b.

The conveyance surfaces extend from the inlet station 18 to the outlet station and have a substantially quadrangular shape with the longer sides thereof arranged parallel to the main advancement direction 6.

The two conveyance surfaces 60a, 60b are positioned parallel and adjacent to each other.

Furthermore, the second conveyance surface 60b is located adjacent to the third conveyance surface 53c of the first conveyance device 53.

In this case, too, the first conveyance surface 60a will have a greater coefficient of friction than the second conveyance surface 60b of the third conveyance device 60.

The surfaces can be obtained through the use of two distinct and separate elements (as shown) or even a single element with surface properties in terms of coefficient of friction on the two distinct surfaces.

This embodiment as well comprises the use of two separate conveyor belts 64, 65, which are mounted on respective shafts positioned at the inlet and outlet stations 18 and 19 as previously described.

In particular, observing the selector module 17 from above (FIG. 23) one will note the presence, on one side and the other, of the selector module of the first conveyance surface 60a and the second conveyance surface 60b of the third conveyance device 60, the third conveyance surface 53c, the first conveyance surface 53a and the second conveyance surface 53b and the first conveyance device 53 and the second conveyance surface 54b being followed by the first conveyance surface 54a of the second conveyance device 54.

The assembly described above will cover substantially the entire transversal extension of the selector module 17, while possibly leaving small gaps between the conveyor belts, which are not such, however, as to enable the occurrence of jamming or falls or otherwise cause problems of any sort to any of the products or the articles conveyable by the singulator.

In this case, too, the third conveyance system 63 will have a respective motor 63b, in particular an electric motor, and a respective transmission 63a (a gear reducer and a belt); the transmission 63a will be active on a respective shaft 68 (see FIG. 26) in order to move the first and second surfaces 60a, 60b with the same advancement speed from the inlet station 18 to the outlet station 19.

In this way, the two conveyor belts 64, 65 will also move at the same forward speed, which being controlled independently, may be different, or in any case independent, both of the first advancement speed of the first conveyance device 53 and the advancement speed of the belts of the second conveyance device 54.

It should also be noted that the specific embodiment has conveyor belts 55, 56, 57, 61, 62, 64, 65, though the same functions might be obtained through the use of respective roller conveyors with different coefficients of friction (e.g. smooth rollers flanked by rubber-coated rollers); the various functions can also be obtained from a single continuous roller conveyor having axes of rotation that are perpendicular to the main advancement direction 6, in which the various above-described conveyance surfaces will differ due to portions having different coefficients of friction. It will also be possible to use conveyor belts having suitable holes in which idle rollers are mounted, and which also have different coefficients of friction according to the conveyance surfaces that they are intended to define.

The above is intended to demonstrate that there can be different embodiments of the selector module 17 according to the third embodiment, as long as they can allow an active conveyance of articles placed on the various conveyance surfaces, which determine, in cooperation with an article 5, a different coefficient of friction, as described.

From the point of view of distribution, the surfaces of a same module (converger, diverger or selector) defining a coefficient of friction greater than that of other surfaces are placed in zones where a stream of articles is expected to be received according to the three advancement lines A, B, C.

The conveyance surface 53a, which is intended to receive the greatest flow of articles, will have larger dimensions so that the flow can be optimally managed; on the other hand, the surfaces intended to receive the articles arriving from the advancement lines B and C will have smaller transversal dimensions, as they will generally be designed to process a smaller number of articles.

The presence between the aforementioned surfaces 53a and 54a and 60a of additional low-friction conveyance surfaces also enables at least partially anomalous situations to be managed.

In fact, the presence of motorized belts in the zones between the high-friction belts firstly enables removal of any incoming articles that are not arranged in one of the three advancement lines A, B, C due to an error of singulation.

Furthermore, a product that might be, for example, in the advancement line B, and thus reach the first conveyance surface 54a, but which has very large transversal dimensions, such as to involve the other additional low-friction conveyance surfaces 54b and 53b, will receive a greater push from the higher-friction belt 54a, but also a contribution for pushing from the second conveyance surface 54b (and even if of a smaller entity). If, for any reason, the central zone 21 were not moved, the second conveyance surface 53b would be stationary, but they would not exhibit a high coefficient of friction and there would be a minimal influence on the conveyance and rotation of any product supported on the three conveyance surfaces mentioned above.

On the other hand, if the low-friction conveyance surfaces were passive surfaces, even at low friction this could also lead to partial rotations, especially of products on high-friction belts of ends having smaller transversal dimensions.

The presence of belts able to determine, in cooperation with an article 5, a differentiated coefficient of friction enables, as described above, the management of any critical situations in which articles might be in undesired zones but in any case enables management of optimal transversal dimensions with only three motor drives, thus in any case differentiating the effect on the articles and simulating the presence of a plurality of motor drives/belts.

Figure 19A:
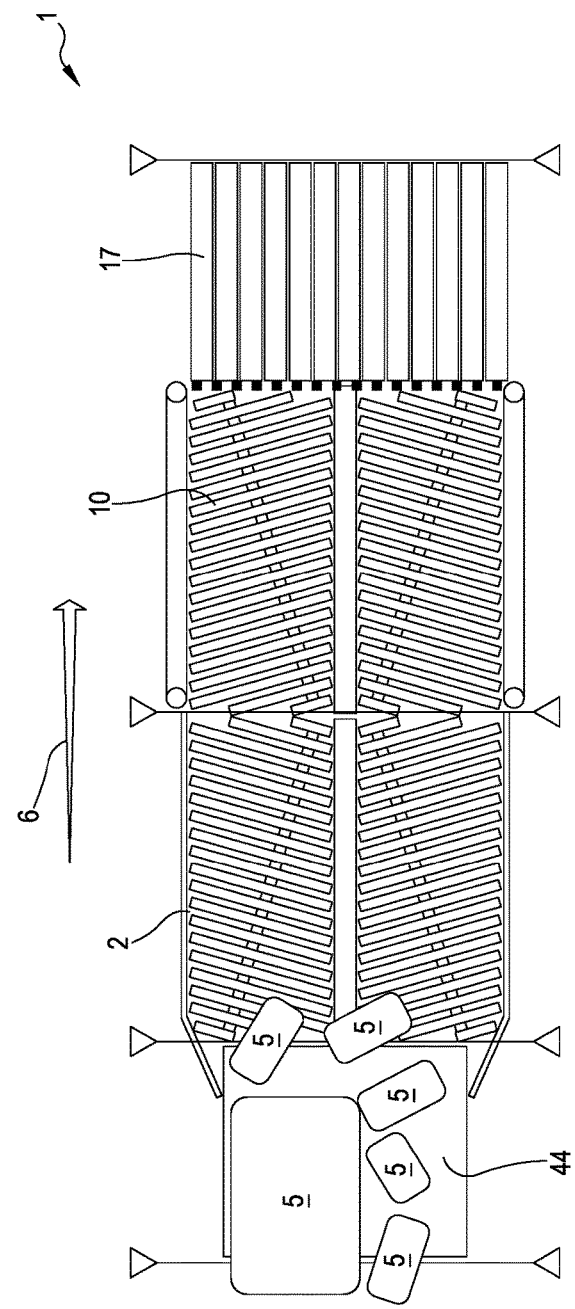
Figure 19B:
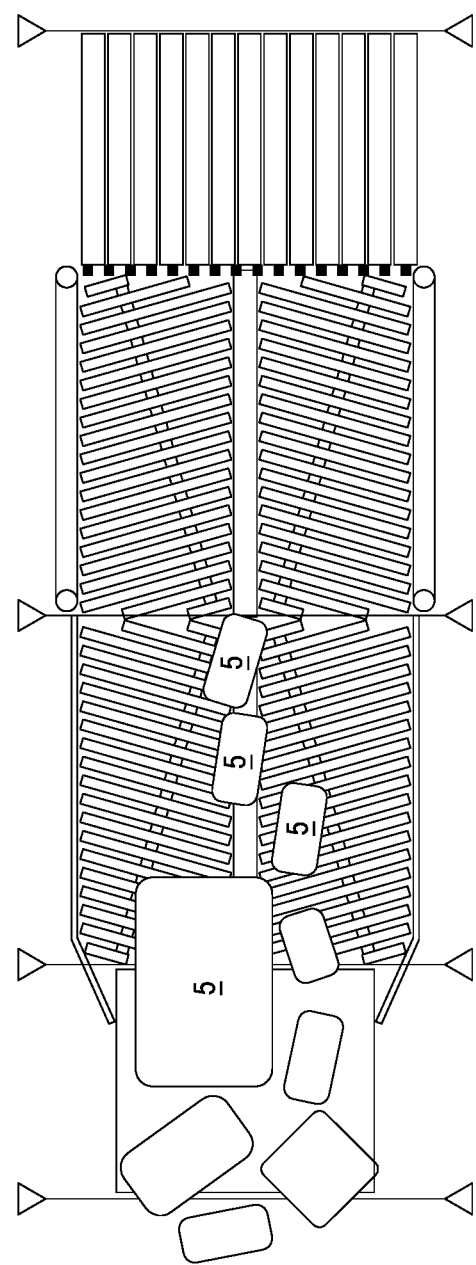

FIGS. 19A to 19O are examples illustrating the operation of the singulator briefly described above.

As can be seen from FIG. 19A, a plurality of articles arrive in loose order via the inlet conveyor belt to the inlet station 3 of the converger module.

Figure 19C:
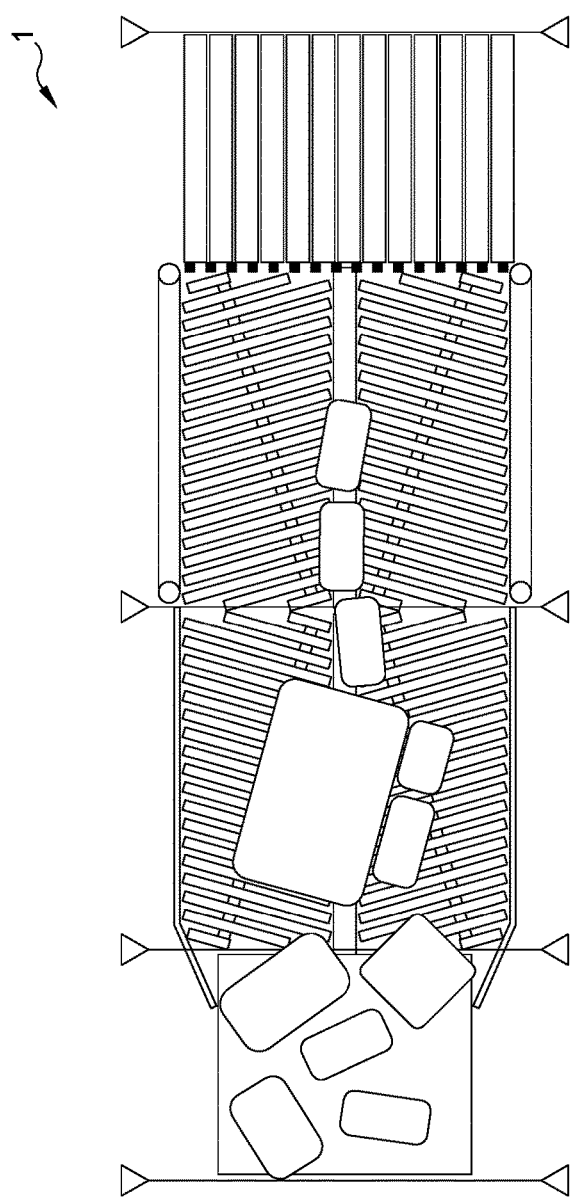
Figure 19D:
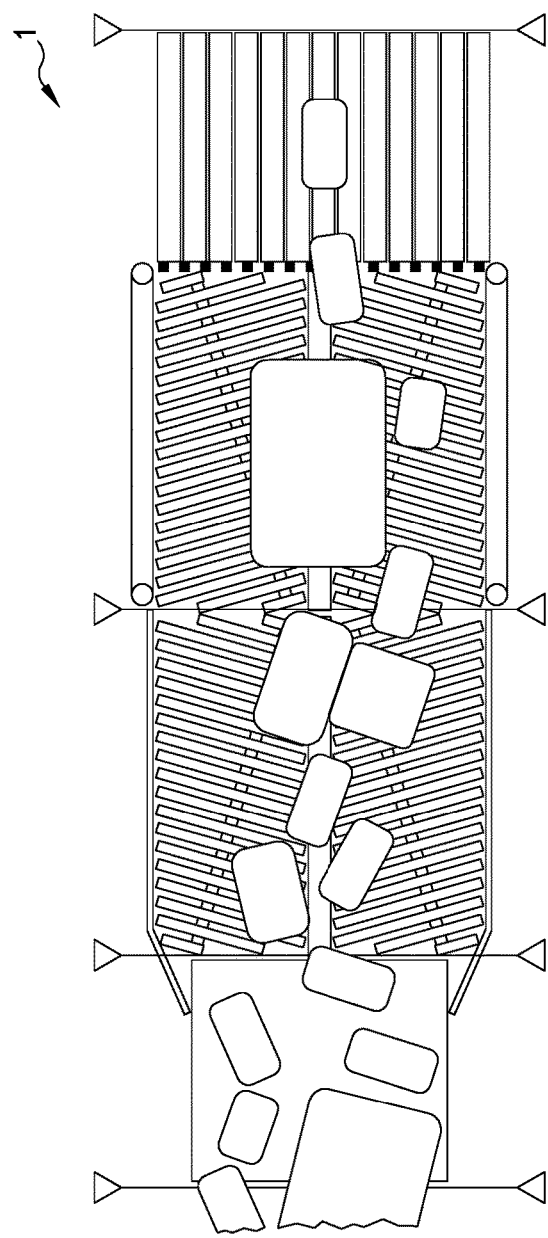

Observing the following sequence of figures, one can see that the converger module tends to bring the various articles 5 to the first zone 7, creating a first file or line of advancement of the singulated products.

Where two or more items are pushed into the same portion of the first zone 7 of the converger module 2, obviously only one of the articles would remain resting in the first zone 7, while the remainder would rest in the second or third zone (FIGS. 19C, 19D).

From here the articles enter the diverger module 10.

Those resting in the first zone 7 come into direct contact with the first zone 13 of the diverger module.

On the other hand, all the articles that had not been brought to the central zone (the first zone of the converger module and the first zone of the diverger module) are directed externally away from the first zone 13 towards the third or the fifth zone of the diverger module 10 until they come to rest on the lateral walls 42, 43 or in any case come into contact with the third and fifth zones of the diverger module 10.

In this way, three lines of products will be generated at the outlet station 12 of the diverger module 10, which products will advance only along the main advancement direction 6: a first line A at the outlet from the first zone 13 of the diverger module 10, a second line B at the outlet of the resting/unloading station 12 and conveyed from the third zone 16 of the diverger module and a third line C supported and conveyed by the fifth zone of the diverger module 10.

At this stage of singulation, all products have been distributed over the three advancement lines A, B, C.

In this situation the articles pass through the detection system 27 and enter the selector module 17.

Thanks to the detection system 27, the control unit 22 is aware of the exact positioning of the individual articles along the three advancement lines A, B, C.

Figure 19E:
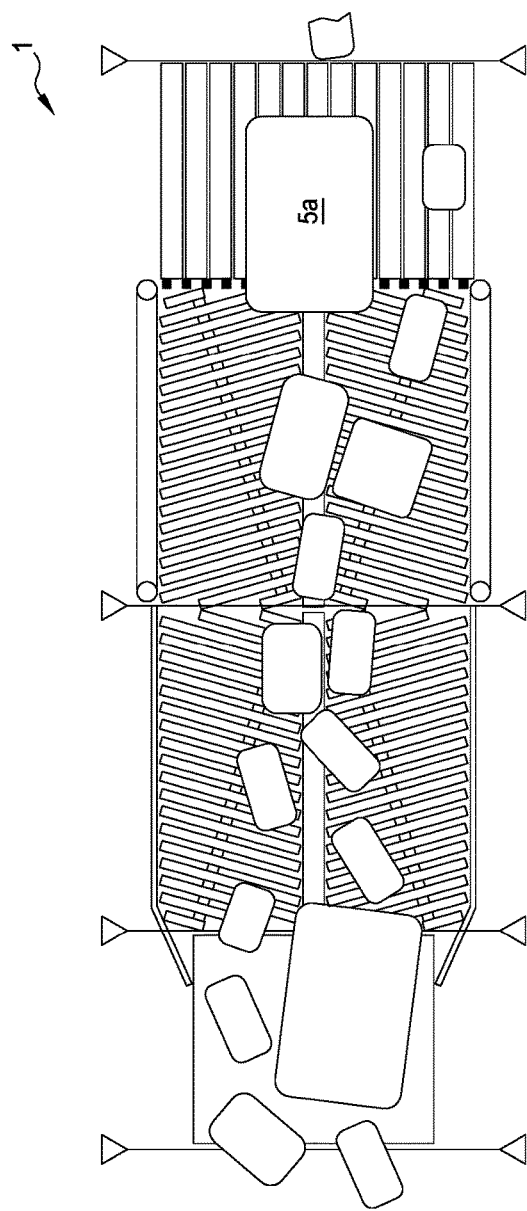
Figure 19F:
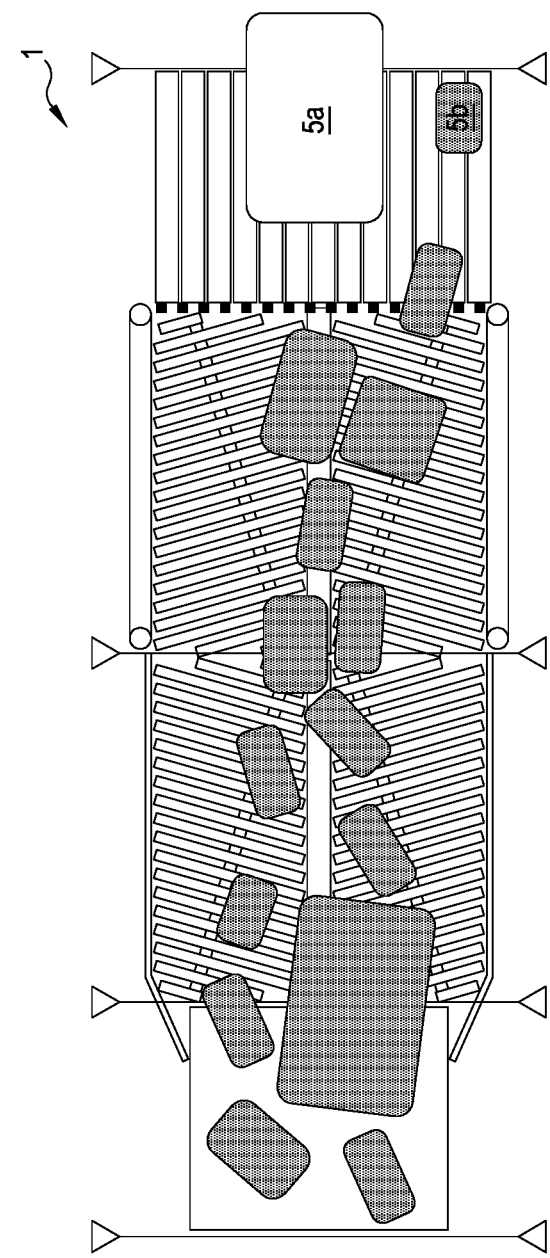
Figure 19G:
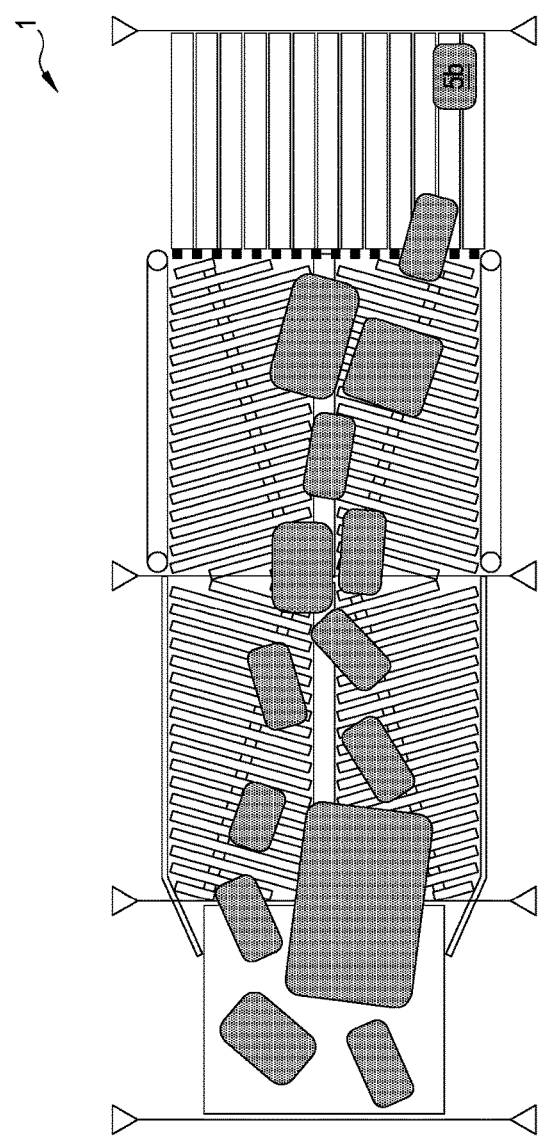
Figure 19H:
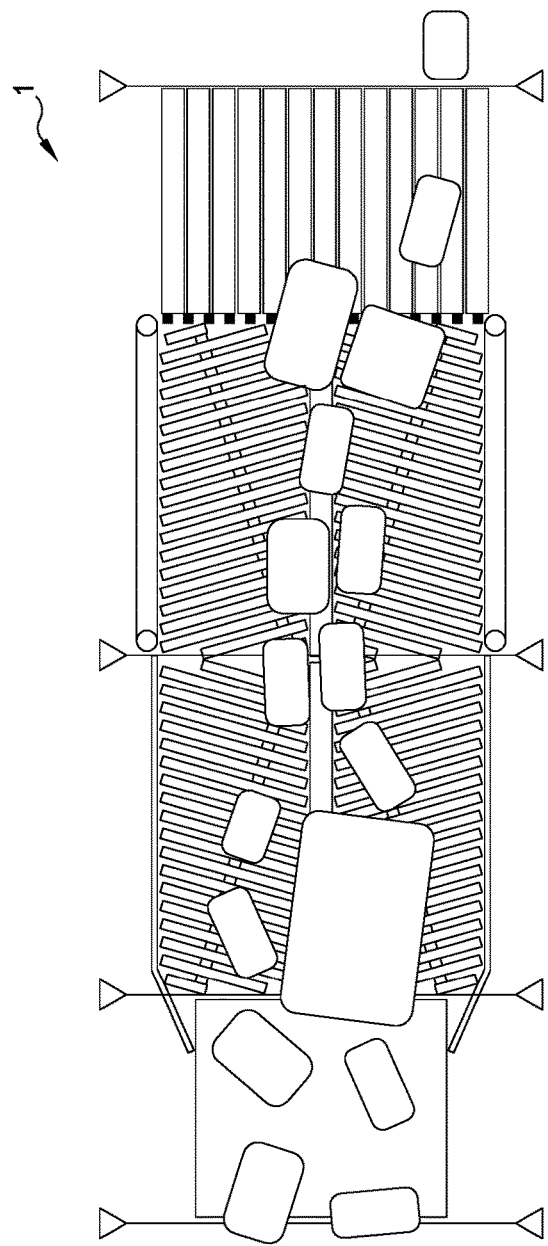
Figure 19I:
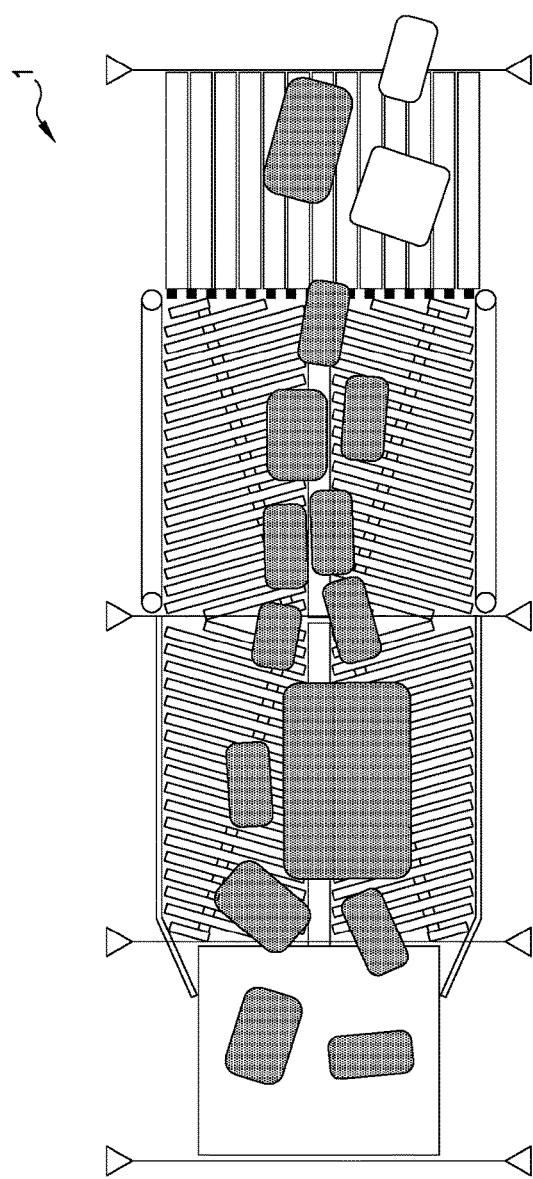
Figure 19L:
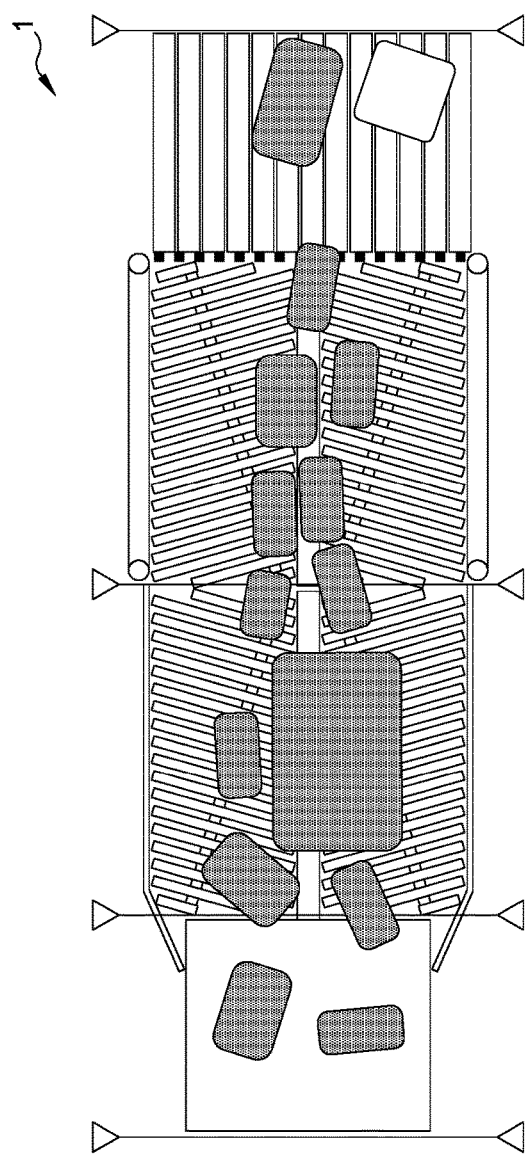
Figure 19M:
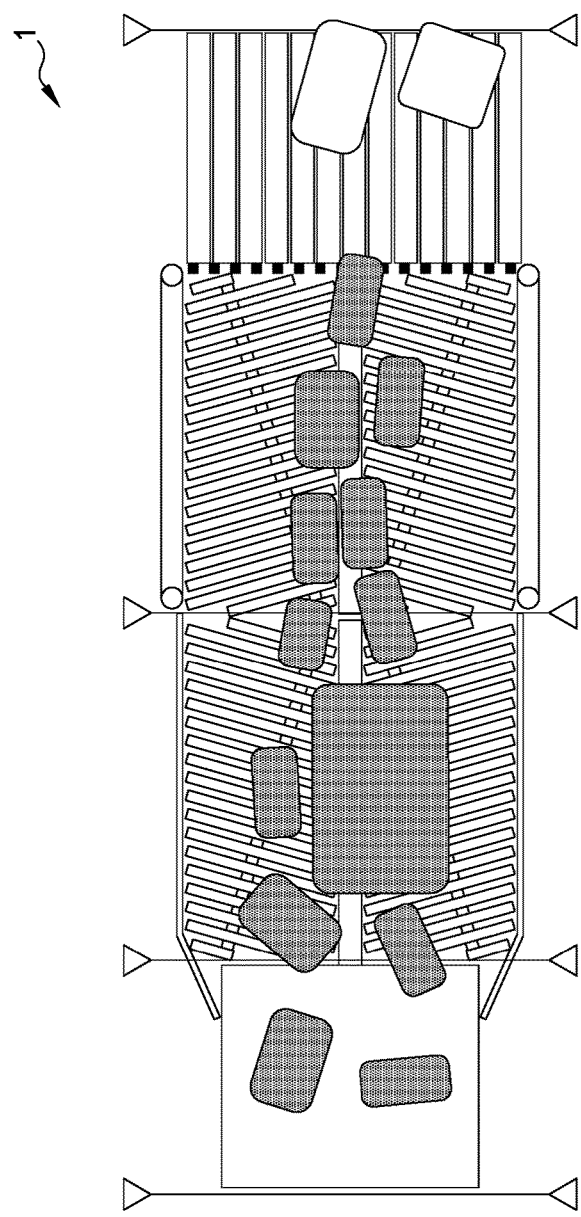
Figure 19N:
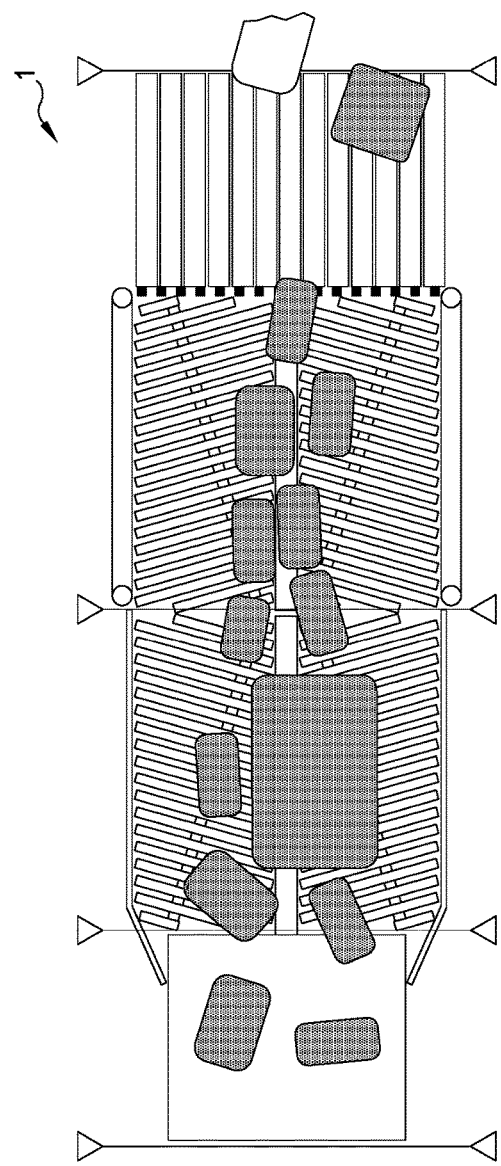
Figure 190:
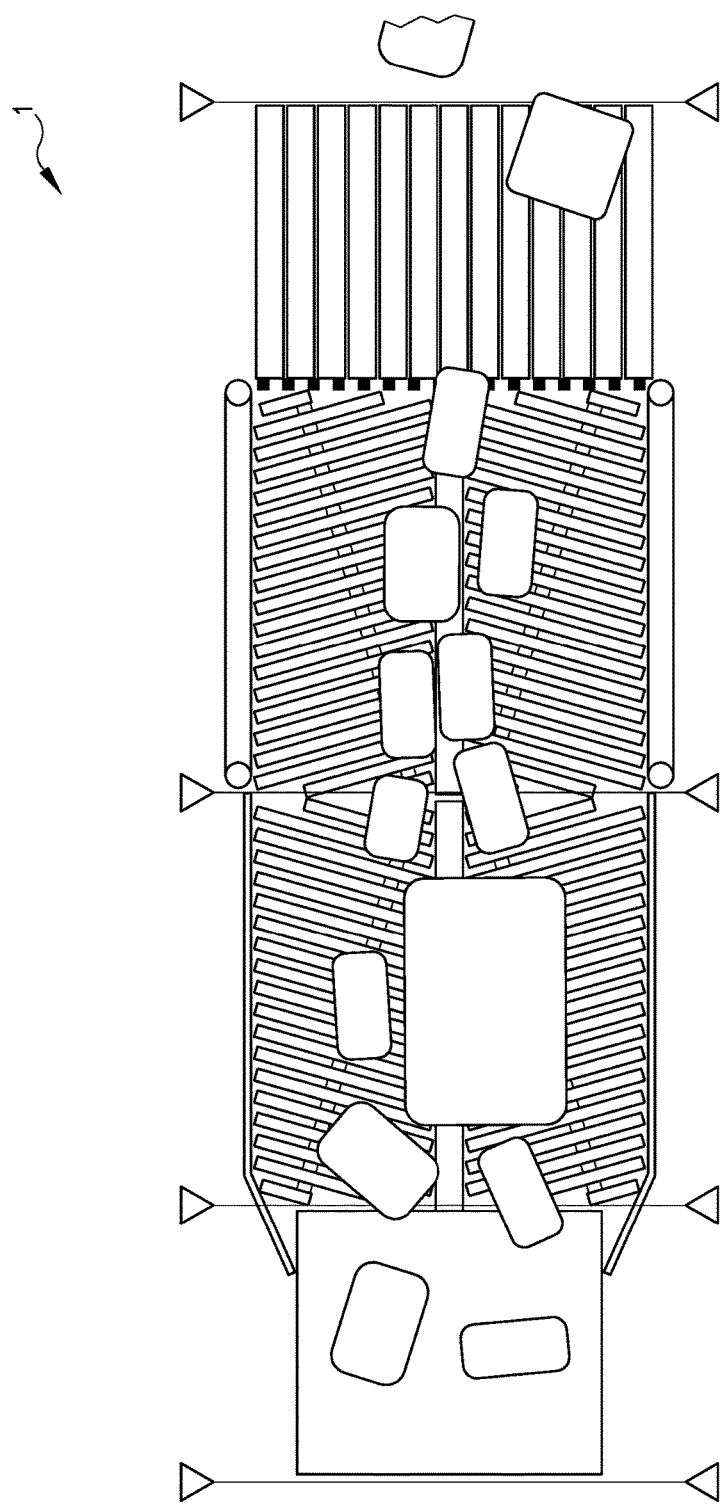

In the event that the simultaneous presence at a same cross section of the conveyor module 17 of two or more articles is detected on two or more advancement lines, the control unit 22 itself can differentiate the speed profiles of the three zones in which the three product lines are located in such a way as to achieve the outfeed of a single product at a time from the outlet station 19 irrespective of whether superimposed articles along the transverse direction are on different lines (see the sequence of FIGS. 19E to 19G, where the article 5b superimposed on the article 5a is halted until the former has completely exited).

In this way, it is ensured that at the outlet of the singulator, the products which are mainly on the central line A and possibly the auxiliary lines B and C are in any case longitudinally spaced from one another and can therefore be automatically managed and singulated in single file with known techniques.

Figure 22:
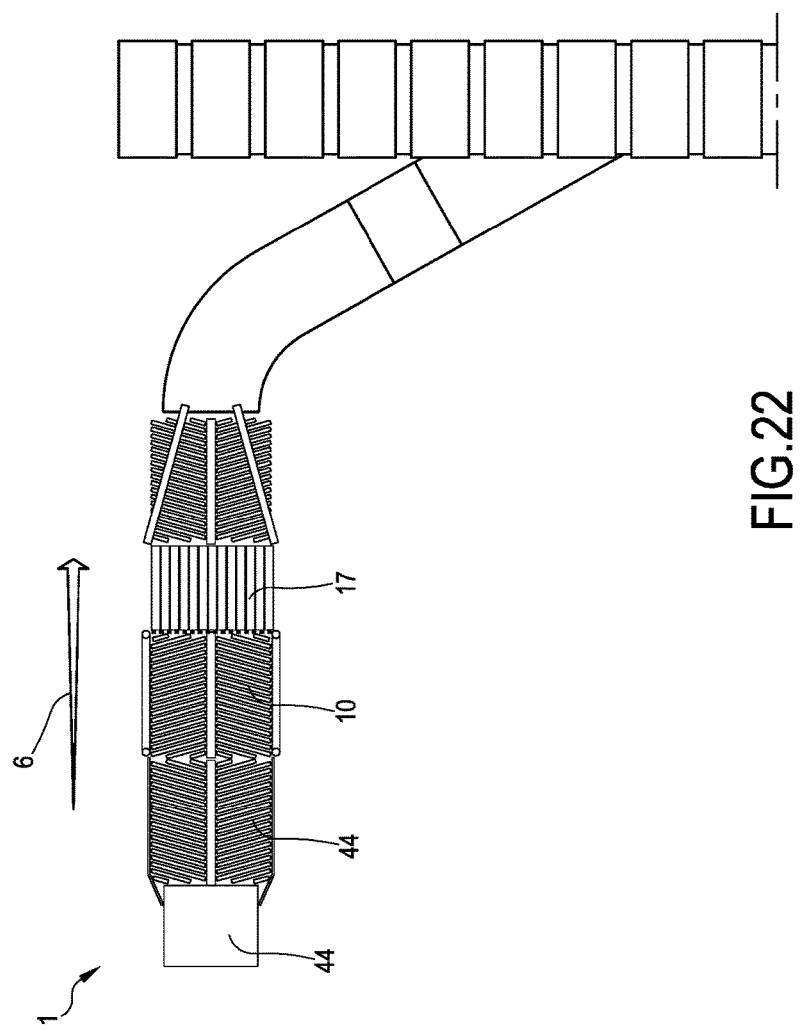

In particular, the configurations that the system can assume overall are illustrated for example in FIGS. 20, 21 and 22, which illustrate, merely by way of example, a configuration with two singulators on the inlet side of a conveyance line (FIG. 21) and also an individual singulator provided, downstream of the selector module 17, with an element having converging lateral walls for bringing the elements into single file.

Figure 28:
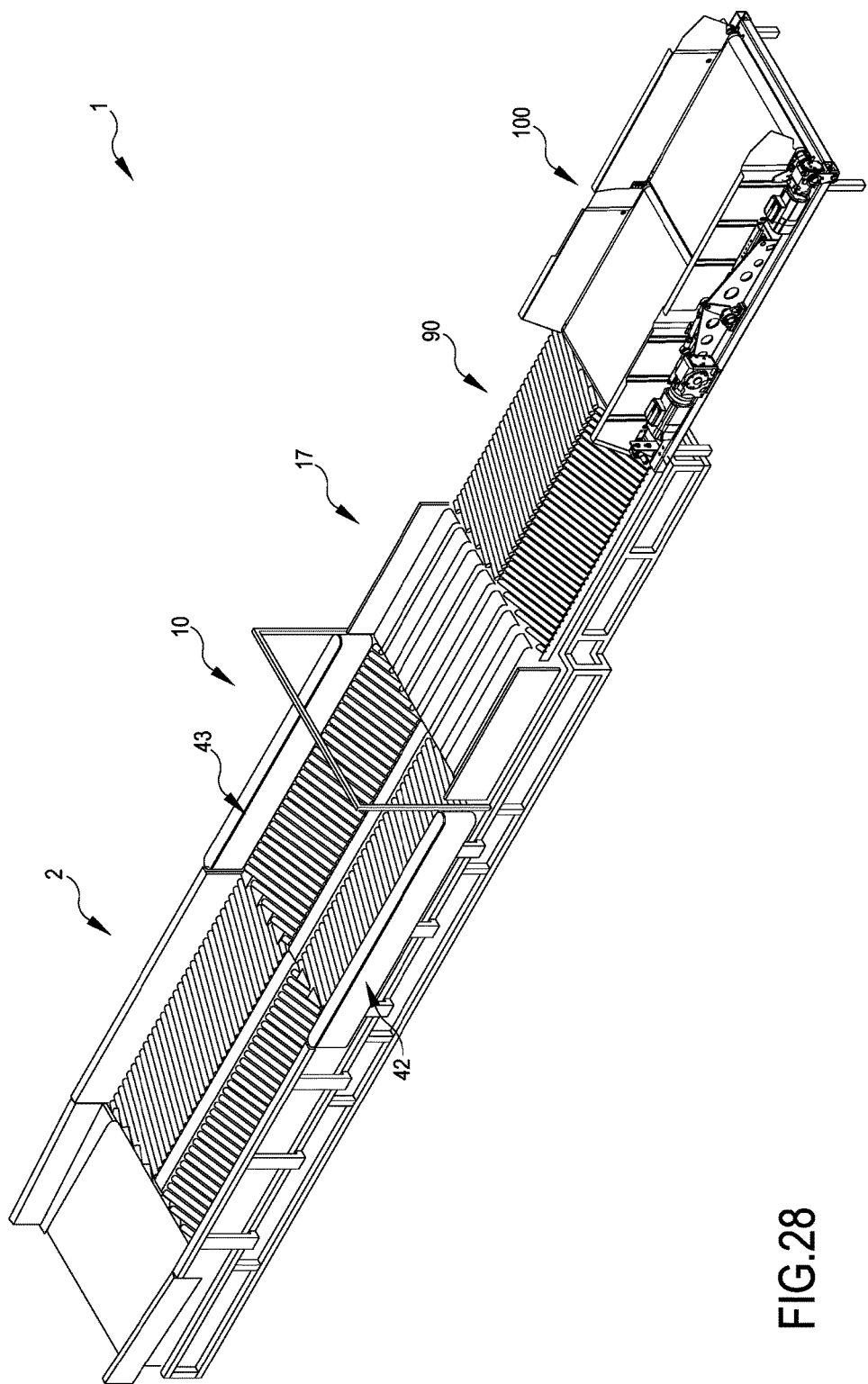
FIG. 28 shows an overall view of a singulator included in a plant for treating articles.

It should also be noted, particularly with reference to FIG. 28, that the singulator of the present description can also provide an opportunity to divert articles in transit after the articles themselves have passed through the converger module, diverger module and the selector module, should problems of a following type occur: products not singulated or introduced products which exceed the maximum size limit for processing in the subsequent stations.

For this purpose, use of a switcher 100 is included, in particular a vertical switcher, i.e. a structure that can define a main advancement path (condition of normal use and advancement of articles) and a switching path in which the articles can be sent to a reject area.

Figure 29:
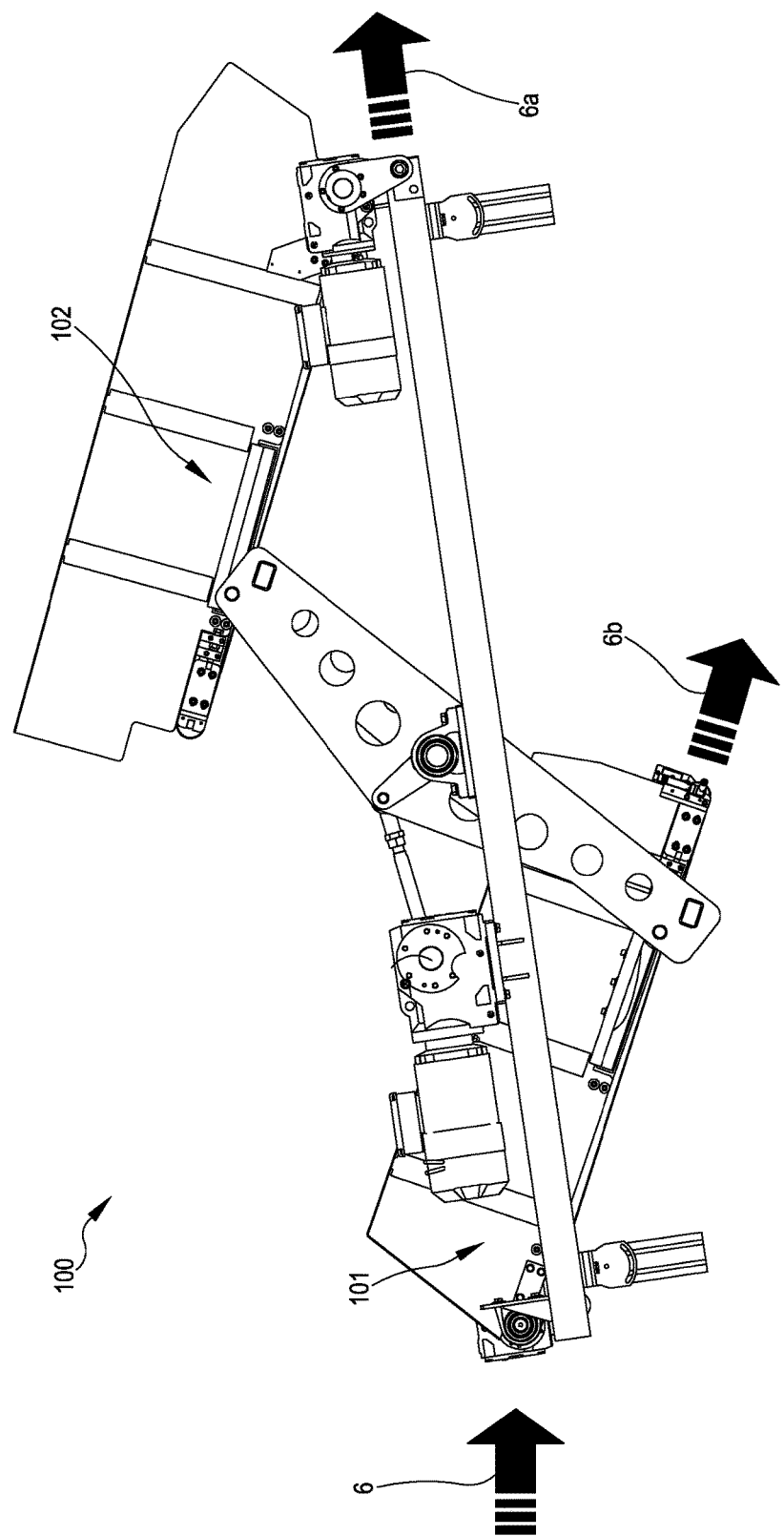
FIG. 29 shows the vertical switcher of FIG. 28.
Figure 30:
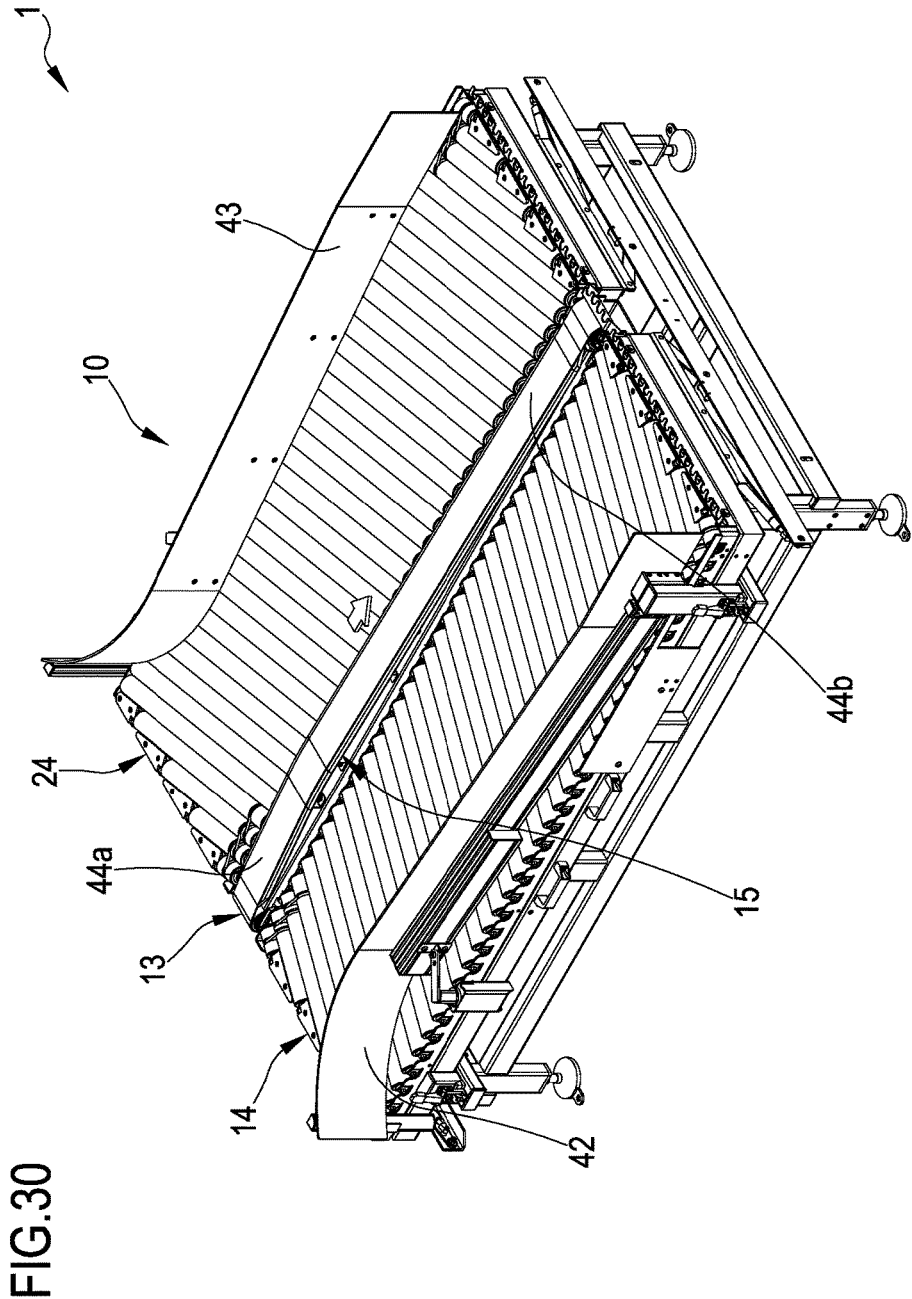
FIG. 30 is a perspective view of a possible embodiment of the diverger module according to the present invention.

In particular, the vertical switcher 100 illustrated in FIG. 29 essentially consists of two conveyor belts 101, 102 tilting around respective opposite axes in such a manner as to define an aligned condition (generally the normal passage of the articles—FIG. 28 and direction 6a in FIG. 29) and an open configuration (FIG. 29—direction 6b) in which the respective ends, usually in proximity, of the first and second belts 101, 102 are vertically distanced and divert the flow of products.

What is described above enables control by activation, for example, by the control unit 22, of the opening/closing of the vertical switcher 100 and therefore the normal functioning or unloading of the products towards the unloading zone.

Advantages of the Invention

The embodiments described and illustrated above achieve significant advantages.

First of all, the structure of the diverger module serves to ensure the separation, and consequently singulation, of articles irrespective of the condition in which the latter arrive from the converger module 2. In greater detail, the ascent zone 15 prevents the articles 5 advancing in the first zone 13 of the diverger module 10 and at least partially overlapping the articles advancing in the second and/or fourth zones 14 and 24 from squashing and holding back the latter: in this way it is possible to ensure that the latter articles will be moved away from the first zone 13.

Moreover, the singulator presented in its various embodiments is compact and involves modest costs.

The singulating operations are obtained with a first part (converger module and diverger module) that is substantially mechanically active on the various articles in order to bring them from a loosely ordered condition into a condition in which the articles are arranged in only three advancement lines (a main line and two secondary lines).

The electronic control part is minimized, thus increasing operational reliability, but at the same time ensuring a high level of flexibility, it being possible to manage a fine level of singulation in the selector module 17.

The footprint of the whole device, in both the longitudinal and transversal directions, is rather modest while guaranteeing the ability to handle a rather high number of articles to be singulated per unit of time.

The invention claimed is:

1. A singulator comprising:
   at least a diverger module extending between an inlet station and an outlet station, the diverger module being configured to receive articles at the inlet station, and to convey them towards the outlet station along a main advancement direction, the diverger module comprising:
   at least a first zone extending from the inlet station to the outlet station, and configured to impart to the articles resting thereon an advancement motion along the main advancement direction;
   at least a second zone flanking the first zone along the main advancement direction and extending between the inlet station and outlet station, said second zone being configured to impart to the articles resting thereon an advancement motion along the main direction, and a lateral movement away from the first zone;
   the first zone of the diverger module projects, at least for a length, away from a prevalent average plane of extension of the second zone in the direction of the articles to be supported, in order to define an ascent zone of the diverger module, wherein the ascent zone comprises at least an ascending ramp and a descending ramp consecutively disposed along the advancement direction.

2. The singulator of claim 1, wherein said ascending ramp extends along a prevalent direction of extension which defines, with the prevalent average plane of extension of the second zone, a subtended angle comprised between 3° and 30°, and wherein said descending ramp extends along a prevalent direction of extension which defines, with the average plane of extension of the second zone, a subtended angle comprised between 3° and 30°.

3. The singulator of claim 1, wherein the ascent zone defines, relative to the second zone, a maximum difference in height comprised between 2 cm and 10 cm.

4. The singulator of claim 2, wherein the ascending ramp extends for a length of less than 50% of the total extent of the first zone, and wherein said ascending ramp extends from the inlet station.

5. The singulator of claim 1, wherein the diverger module (10) comprises:
   at least a third zone, flanking the second zone along the main advancement direction on the opposite side relative to the first zone and extending from an initial position comprised between the inlet station and a middle zone to the outlet station, the articles in said third zone being conveyed along the advancement direction to the outlet station.

6. The singulator of claim 1, wherein the diverger module comprises:
   a fourth zone extending between an inlet station and an outlet station and flanking the first zone along the main advancement direction on the side opposite to the second zone, the fourth zone being configured to impart to the articles resting thereon an advancing movement along the main advancement direction and a lateral movement away from the first zone; and
   a fifth zone flanking the fourth zone along the main advancement direction on the side opposite to the first zone, the articles in said fifth zone being conveyed along the advancement direction to the outlet station.

7. The singulator of claim 1, wherein the first zone of the diverger module comprises a conveyor configured to define, in cooperation with an article, a predetermined coefficient of friction that is greater than the coefficient of friction defined by the second zone in cooperation with the same article.

8. The singulator of claim 6, wherein the second zone of the diverger module comprises a conveying element, and configured to impart the advancement motion towards the outlet station and the lateral movement away from first zone, the fourth zone of the diverger module comprising a conveying element configured to impart the advancement motion towards the outlet station and the lateral movement away from first zone.

9. The singulator of claim 5, wherein the third zone of the diverger module comprises a lateral wall projecting from an average plane of the second zone, said lateral wall being configured to supportingly receive the articles pushed by the second zone away from first zone, and configured to enable conveyance along the main advancement direction towards the outlet station, the fifth zone of the diverger module comprising, in particular, a lateral wall projecting from an average plane of the fourth zone, said lateral wall being configured to supportively receive the articles pushed by fourth zone away from first zone, and configured to enable conveyance along the main advancement direction towards the outlet station.

10. A singulator comprising:
at least a diverger module extending between an inlet station and an outlet station, the diverger module being configured to receive articles at the input station and to convey them towards the outlet station along a main advancement direction, the diverger module having a first zone for imparting to the articles resting thereon an advancement motion along the main advancement direction, a second zone flanking the first zone along the advancement direction and extending between the inlet station and outlet station, said second zone being configured to impart to the articles resting thereon an advancement motion along the main direction and a lateral movement away from the first zone, at least a third zone, flanking the second zone along the main advancement direction on the opposite side relative to the first zone and extending from an initial position comprised between the inlet station and a middle zone to the outlet station, the articles in said third zone being conveyed along the advancement direction to the outlet station, the first zone of the diverger module projecting, at least for a length, away from a prevalent average plane of extension of the second zone in the direction of the articles to be supported, in order to define an ascent zone of the diverger module,
at least a selector module located downstream of the diverger module along the main advancement direction and extending between a corresponding inlet station and an outlet station, the selector module having a first zone configured to receive the articles conveyed at least by the first zone of the diverger module and to impart to the articles resting thereon an advancement motion along the main advancement direction from the inlet station to the outlet station, and having a second zone configured to receive the articles conveyed from the third zone of the diverger module and to impart to the articles resting thereon an advancement motion along the main advancement direction from the inlet station to the outlet station; and
a control unit which is active at least on the first zone of the selecting module so as to impart an advancement motion along the main advancement direction according to a first speed profile and active at least in the second zone of the selecting module so as to impart an advancement motion along the main advancement direction according to a second speed profile independent of the first speed profile.

11. The singulator of claim 10, wherein the ascent zone comprises at least an ascending ramp and a descending ramp consecutively disposed along the advancement direction.

12. The singulator of claim 11, wherein the ascending ramp extends for a length of less than 50% of the total extent of the first zone.

13. The singulator of claim 10, wherein the ascent zone substantially extends for the full length of the diverger module.

14. A singulator comprising:
at least a diverger module extending between an inlet station and an outlet station, the diverger module being configured to receive articles at the inlet station, and to convey them towards the outlet station along a main advancement direction, the diverger module comprising:
at least a first zone comprising a conveyor extending from the inlet station to the outlet station, and configured to impart to the articles resting thereon an advancement motion along the main advancement direction;
at least a second zone flanking the first zone along the main advancement direction and extending between the inlet station and outlet station, said second zone being configured to impart to the articles resting thereon an advancement motion along the main direction, and a lateral movement away from the first zone, the second zone of the diverger module comprises a conveying element, configured to impart the advancement motion towards the outlet station and the lateral movement away from first zone;
the conveyor of the first zone of the diverger module is configured to define, in cooperation with an article, a predetermined coefficient of friction that is greater than the coefficient of friction defined by the second zone in cooperation with the same article,
the first zone of the diverger module projects, at least for a length, away from a prevalent average plane of extension of the second zone in the direction of the articles to be supported, in order to define an ascent zone of the diverger module, wherein the ascent zone comprises at least an ascending ramp and a descending ramp consecutively disposed along the advancement direction.

15. The singulator of claim 14, wherein the first zone comprises a conveyor belt.

16. The singulator of claim 14, wherein the second zone comprises a roller conveyor whose rollers have an axis that is inclined relative to the main advancement direction.

* * * * *